United States Patent
Chun et al.

(10) Patent No.: US 9,762,842 B2
(45) Date of Patent: Sep. 12, 2017

(54) IMAGE DISPLAY METHOD AND APPARATUS

(71) Applicant: LG ELECTRONICS INC., Seoul (KR)

(72) Inventors: Seungsik Chun, Seoul (KR); Hyunseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 194 days.

(21) Appl. No.: 14/742,244

(22) Filed: Jun. 17, 2015

(65) Prior Publication Data

US 2015/0288912 A1 Oct. 8, 2015

Related U.S. Application Data

(63) Continuation of application No. 13/399,679, filed on Feb. 17, 2012, now Pat. No. 9,088,814.

(30) Foreign Application Priority Data

Aug. 11, 2011 (KR) .......................... 10-2011-0080304

(51) Int. Cl.
  *H04N 5/44* (2011.01)
  *G06F 3/14* (2006.01)
  *H04N 21/41* (2011.01)
  *H04N 21/422* (2011.01)
  *H04N 21/431* (2011.01)
  (Continued)

(52) U.S. Cl.
  CPC ........... *H04N 5/4403* (2013.01); *G06F 3/147* (2013.01); *G06F 3/1462* (2013.01); *H04M 1/72527* (2013.01); *H04N 5/45* (2013.01); *H04N 21/4126* (2013.01); *H04N 21/4222* (2013.01); *H04N 21/42207* (2013.01); *H04N 21/42208* (2013.01); *H04N 21/4316* (2013.01); *H04N 21/43615* (2013.01); *H04N 21/4882* (2013.01); *H04M 1/72533* (2013.01)

(58) Field of Classification Search
  CPC ..... G06F 3/147; G06F 3/1462; H04N 5/4403; H04N 5/45; H04N 21/42208; H04N 21/4882
  USPC .................. 455/414.1, 414.2, 415, 418–420; 715/734, 763, 765; 725/31, 52, 94; 348/552, 744
  See application file for complete search history.

(56) References Cited

U.S. PATENT DOCUMENTS

2003/0040334 A1  2/2003 Lee
2009/0091612 A1  4/2009 Sekizawa et al.
(Continued)

FOREIGN PATENT DOCUMENTS

KR  10-0407966 B1  12/2003
KR  10-2008-0028461 A  3/2008
(Continued)

*Primary Examiner* — Sam Bhattacharya
(74) *Attorney, Agent, or Firm* — Birch, Stewart, Kolasch & Birch, LLP

(57) ABSTRACT

An image display apparatus including a display unit a data on a screen; a communication unit receiving a signal transmitted from a remote control device; and a control unit configured to detect whether an external device is connected to the apparatus; display a menu allowing an user to select whether or not to transmit an image being displayed on the external device to the screen; and display the image on the screen.

18 Claims, 28 Drawing Sheets

(51) Int. Cl.
*H04N 21/436* (2011.01)
*H04M 1/725* (2006.01)
*G06F 3/147* (2006.01)
*H04N 5/45* (2011.01)
*H04N 21/488* (2011.01)

(56) References Cited

U.S. PATENT DOCUMENTS

| | | |
|---|---|---|
| 2010/0109795 A1 | 5/2010 | Jones et al. |
| 2011/0165841 A1 | 7/2011 | Baek et al. |
| 2011/0231872 A1* | 9/2011 | Gharachorloo .... H04N 21/4126 725/28 |
| 2014/0106720 A1 | 4/2014 | Mairs et al. |

FOREIGN PATENT DOCUMENTS

| | | |
|---|---|---|
| KR | 10-0925513 B1 | 10/2009 |
| KR | 10-2011-0081603 A | 7/2011 |
| WO | WO 2010/051281 A2 | 5/2010 |

\* cited by examiner

IMAGE DISPLAY METHOD AND APPARATUS

CROSS REFERENCE TO RELATED APPLICATION

This application is a Continuation of co-pending U.S. application Ser. No. 13/399,679 filed Feb. 17, 2012, which claims priority under 35 U.S.C. §119 the priority benefit of Korean Patent Application No. 10-2011-0080304, filed on Aug. 11, 2011, which is hereby incorporated by reference in its entirety into this application.

BACKGROUND OF THE INVENTION

Technical Field

The present invention relates to an image display method and apparatus, and more particular, to a method for displaying an image such as a video currently being displayed on a terminal in synchronization on the image display apparatus.

Description of the Related Art

In recent years, a portable terminal, which can exchange wireless voice telephony and information with other terminals, has become a requisite by the relentless march of technology. With the development of Internet-based technologies, the use of portable terminals has been increasingly expanded to other areas such as games, use of a remote controller using a local area network, or photographing of video by a mounted digital camera, and the like in addition to managing telephone calls, schedule management, etc. Thus, the user's need to manage and use a wide variety of different services and functions can be fulfilled. Accordingly, technologies in which the user can watch the videos of the portable terminal on the big screen of the video display apparatus by connecting the portable terminal to the video display apparatus are being developed.

Such a video display apparatus displays a video input from the outside. Then a device for providing the video on the video display apparatus may be a portable terminal, a DVD or a set-top box. Accordingly, technologies in which the user can watch the videos of the portable terminal on the larger screen of the video display apparatus by connecting the portable terminal to the video display apparatus are being developed.

However, although the user may watch the videos of the portable terminal on the bigger screen of the video display apparatus, there are complex problems and limitations associated with reproducing the videos of the portable terminal on the bigger screen of the video display apparatus when connecting the portable terminal to the video display apparatus. In addition, there is an inconvenience to have to directly operate the portable terminal in order to control the potable terminal during the reproduction of the videos on the bigger screen. Further, since the user has to directly operate and continuously control the portable terminal to continuously display the videos on the bigger screen of the video display apparatus, the user may not be able to freely and fully enjoy the videos of the portable terminal being displayed on the bigger screen of the video display apparatus.

SUMMARY OF THE INVENTION

To address these and other problems and limitations associated with the related art, the present invention is directed to providing an image display method and apparatus which allow displaying of images of a portable terminal on a screen of the apparatus without directly operating the portable terminal connected to the image display apparatus.

In a method for displaying a video input from the outside on an image display apparatus, the image display method according to an embodiment of the present invention includes receiving and displaying a video displayed on a terminal which may be connected to an internet, receiving from a remote control device coordinate information of a point selected by a user in the displayed video, transmitting the coordinate information received from the remote control device to the terminal, receiving the terminal's video to be changed based on the internet connection operation corresponding to the coordinate information and synchronizing the displayed video with the change.

In an image display apparatus for displaying a video input from the outside, the image display apparatus according to another embodiment of the present invention includes an interface unit receiving a video displayed on a terminal which may be connected to an internet, a display unit displaying the received video, a communication unit receiving from a remote control device coordinate information of a point selected by a user in the displayed video, and a control unit transmitting the coordinate information received from the remote control device to the terminal, wherein the interface unit receives the terminal's display video to be changed based on the internet connection operation corresponded to the coordinate information and the display unit synchronizes the displayed video with the change.

According to the embodiment of the present invention, since the portable terminal connected to the image display apparatus may be controlled through the remote control device, the present invention may provide an improved user convenience that allows the user to freely enjoy the contents of the portable terminal without directly operating the portable terminal.

In addition, even a state where the image display apparatus is not connected to the internet, the user can enjoy the internet contents of the portable terminal on the larger screen of the image display apparatus and thus the present invention is capable of maximizing the utilization of the image display apparatus.

According to an embodiment, the present invention provides a method for displaying an image input externally received on an image display apparatus including a screen, the method including: connecting, by the image display apparatus, to a mobile terminal; displaying, on the screen of the image display apparatus, an indication that the image display apparatus is connected to the mobile terminal; displaying, on the screen, a request to a user whether or not an image from the mobile terminal is to be displayed on the screen; and displaying, on the screen, the image from the mobile terminal, according to a response to the request.

According to an embodiment, the present invention provides a method for displaying an image on an image display apparatus including a screen, the method including: displaying, on the screen, a program; when the image display apparatus is connected to a mobile terminal, transmitting data regarding the program to the mobile terminal so that the mobile terminal can download additional information associated with the program; receiving, by the image display apparatus, the downloaded additional information associated with the program from the mobile terminal; and displaying, on the screen, the received additional information with the program.

According to an embodiment, the present invention provides a method for displaying an image on an image display apparatus including a screen, the method including: displaying, on the screen, a program; connecting the image display apparatus to a mobile terminal; and indicating, on the screen, an incoming call while the program is continued to be displayed on the screen, when the incoming call is receiving by the mobile terminal.

According to an embodiment, the present invention provides an image display apparatus for displaying an externally received image, the apparatus including: a display unit including a screen; and a control unit operatively coupled with the display unit and configured to: connect the apparatus to a mobile terminal; display, on the screen, an indication that the apparatus is connected to the mobile terminal; display, on the screen, a request to a user whether or not an image from the mobile terminal is to be displayed on the screen; and display, on the screen, the image from the mobile terminal, according to a response to the request.

According to an embodiment, the present invention provides an image display apparatus including: a display unit including a screen; and a control unit operatively coupled with the display unit and configured to: display, on the screen, a program; when the apparatus is connected to a mobile terminal, transmit data regarding the program to the mobile terminal so that the mobile terminal can download additional information associated with the program; receive the downloaded additional information associated with the program from the mobile terminal; and display, on the screen, the received additional information with the program.

According to an embodiment, the present invention provides an image display apparatus including: a display unit including a screen; and a control unit operatively coupled with the display unit and configured to: display, on the screen, a program; connect the apparatus to a mobile terminal; and indicate, on the screen, an incoming call while the program is continued to be displayed on the screen, when the incoming call is receiving by the mobile terminal.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Hereinafter, an image display apparatus and method according to an embodiment of the present invention will be described with reference to the accompanying drawings in detail.

Furthermore, although the embodiments of the present invention will be described with reference to the accompanying drawings, but the present invention is not restricted or limited by the embodiments.

Terminology used in the specification of the present invention may adapt common technical terminology that is well-known broadly in consideration of the functions of the present invention and it may be varied according to purpose or practices of people who pertain to the art. In addition, terms randomly selected by the applicant are used in specific case, and in this case, its meaning will be described in the corresponding description of the embodiments of the invention. Therefore, the terms used in the specification may be understood as the meaning based on the content of the description, not as the simple title.

An 'image' in the present invention can include a video, a still picture, contents, audio data, video data, other data, etc., such as a still picture, a moving video/clip, texts, an icon, a menu, a symbol, a 3D image, a pop-up window, etc. Further, data includes contents and contents include data.

Figure 1:
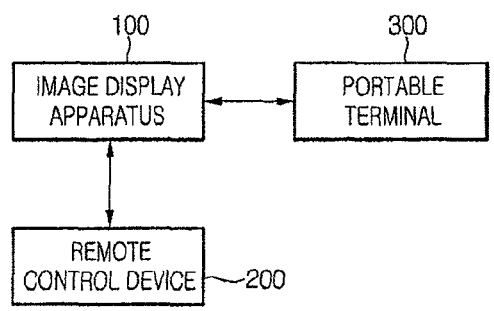
FIG. 1 is a conceptual diagram showing an image display apparatus 100 according to an embodiment of the present invention.

FIG. 1 is a conceptual diagram showing an image display apparatus 100 according to an embodiment of the present invention.

Referring to FIG. 1, the image display apparatus 100 is connected to a portable terminal 300 and may display an image such as a video synchronized with the video previously reproduced or currently being reproduced on the portable terminal 300. In addition, the image display apparatus 100 may receive a control signal including coordinate information of a point on a screen of the apparatus 100 selected by a user from a remote control device 200. The received control signal is transmitted from the apparatus 100 to the portable terminal 300 and a function corresponding to the transmitted signal is performed in the portable terminal 300. The image display apparatus 100 may display the synchronized video by receiving a change of the video based on the function performance.

Herein, the portable terminal 300 may be connected to the Internet or other network, and the portable terminal 300 can correspond to various portable terminals including a touch screen or a display device, such as currently used portable notebooks, multimedia devices, tablet computers, smart phones or the like. The portable terminal 300 may be a mobile terminal.

Figure 2:
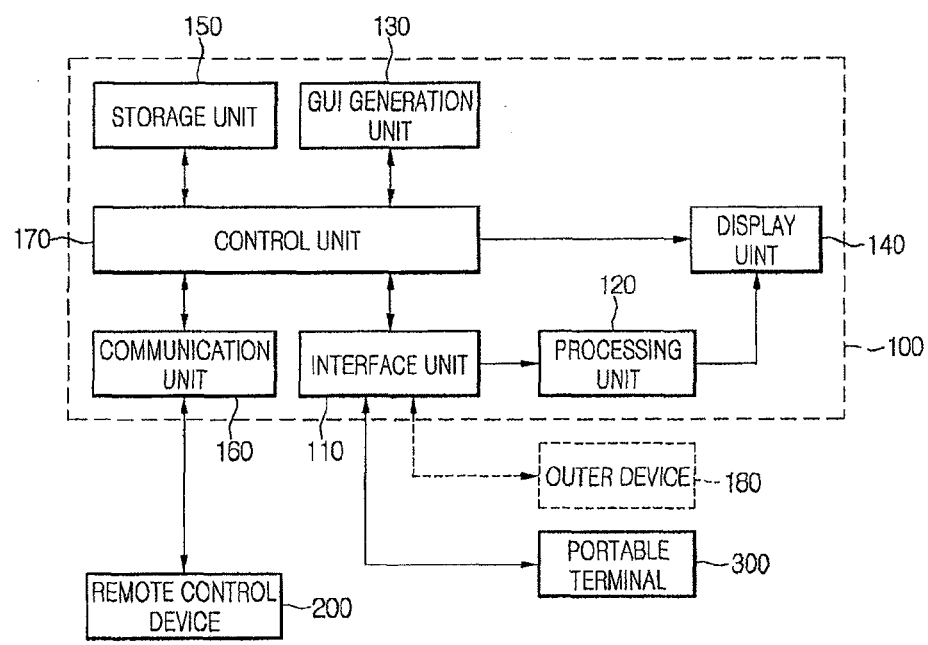
FIG. 2 is a block diagram showing an example of the configuration of the image display apparatus 100 according to the embodiment of the present invention.

FIG. 2 is a block diagram showing an example of one configuration of the image display apparatus 100 according to an embodiment of the present invention. Hereafter, referring to FIG. 2, the image display apparatus 100 according to an embodiment of the present invention will be described in detail.

According to the embodiment of the present invention, the image display apparatus 100 is configured to include an interface unit 110, a processing unit 120, a GUI generation unit 130, a display unit 140 including at least one screen, a storage unit 150, a communication unit 160 for a remote control, and a control unit 170 which controls the operations of the apparatus 100. The apparatus 100 may further include other known components such as a network communication unit, a user input unit, an audio output unit, etc. All components of the apparatus 100 are operatively coupled and configured.

The interface unit 110 performs a function of receiving an image through at least one of units, as a unit for receiving image data from the outside. For example, the interface unit 110 includes a digital external signal input terminal and an analog external signal input terminal connected to an external/outer device 180, and the external device 180 may be implemented with a digital recorder such as a personal video recorder (PVR) and a digital video recorder (DVR). The external device 180 can be any electronic device.

Herein, the digital signal input terminal may be an input terminal for receiving a digital cable broadcast signal or a terminal in which the digital external recorder such as a DVD may be connected, and the analog external signal input terminal may be a VCR signal input terminal or an analog cable broadcast signal input terminal. In particular, the interface unit 110 can include a terminal having a mobile high definition link (MHL) standard to transfer screen data of the portable terminal 300, which has been recently developed. The MHL, which is an abbreviation of the Mobile High Definition Link, is an interface capable of reproducing 1080p HD moving video and digital audio by connecting a HDTV with the smart phone and other portable apparatus (e.g., tablets, cameras, etc.). The MHL can supply power to the portable apparatus at the same time. For instance, when the portable apparatus such as the portable terminal 300 or outer device 180 is connected to the apparatus 100 via the MHL of the interface unit 110, the apparatus 100 can charge the connected portable apparatus through the MHL.

In addition, the MHL technology allows all TV remote controls to control the interface, applications and contents of the user' portable apparatus. Basically, if a portable phone (example of the portable terminal 300) is connected to the HDTV, the larger screen is fully accessible by the operation of the portable phone. As mentioned above, the MHL can charge the portable terminal, and even if only one port capable of being connected to the TV (example of the apparatus 100) exists, the MHL connection is possible between the apparatus 100 and the portable terminal 300.

Further, a standard USB connector may be connected to the port of the apparatus 100. When the portable terminal 300 is connected to the apparatus 100, it is possible for the control unit 170 to recognize whether the portable terminal 300 is automatically connected to the MHL port or the USB port.

Image data such as video data received by the interface unit 110 may include analog television broadcast programs and digital broadcast programs being real-time broadcasted, reproduction programs input from an external reproducer, recording programs and cable broadcast programs. In addition, the video data includes all video signals, audio signals and data signals in case of digital signals, and can include only video signals and audio signals in case of analog signals. In addition, the video data may also include an internet browser screen data or a game screen data, or the like, which are data for displaying an internet browser, game or the like on the screen of the portable terminal 300. Preferably, the screen of the display unit 140 is larger than the screen of the portable terminal 300, but such is not necessary.

Meanwhile, the image data received through the interface unit 110 from the portable terminal 300 or the outer device 180 or other means are processed through the processing unit 120 and then displayed on the screen of the display unit 140.

In this case, the processing unit 120 may include a MPEG-2 decoder for decoding the received video data of the portable terminal 300 and a scaler for converting the decoded video data into a vertical frequency, resolution and aspect ratio corresponding to an output specification of the display unit 140. For instance, the processing unit 120 can convert the format of the received video data into a format more suitable for the display unit 140 of the image display apparatus. As an example, the processing unit 120 may convert the format of the received video data of the portable terminal 300 into a format suitable for a personal computer (PC). In that case, the display unit 140 may display the video data in the new format or may transfer the same to another device such as a PC.

The display unit 140 may be at least one of various types of display modules such as a digital light processing (DLP), a liquid crystal display (LCD), a plasma display panel (PDP), a light emitting diode lamp (LED), organic light emitting diodes (OLED) and the like. The display unit 140 may include one or more display screens which may be touch-sensitive screens. At least one screen of the display unit 140 may be a 3D screen for displaying 3-Dimensional images.

The GUI generation unit 130 generates menu screens for setting use conditions of the image display apparatus according to the control of the control unit 170 and adds the generated menu screens to the video data received from the interface unit 110. Herein, the GUI generation unit 130 can generate a menu screen as an on-screen display (OSD), and the generated data as the OSD type which may be character data or graphic data.

The character data may include alarm messages indicating that the video program requested from the user cannot be received. In addition, the graphic data may be a menu screen through which the user may select a pointer of the remote control device 200 for inputting the control signal and a specific menu item by using the pointer.

The user can input commands the user wants by selecting the specific menu item(s) existed in the GUI using the generated pointer through the GUI generation unit 130.

The storage unit 150 may store software related to the operation of the image display apparatus 100 and various types of data generated during the operation of the image display apparatus 100. The storage unit 150 may be implemented as an electrically erasable programmable read-only memory (EEPROM), and preferably connected to the control unit 170 described later according to an I2C manner. The storage unit 150 may include an internal memory as well as a removable external memory such as a memory stick.

The communication unit 160 is a unit for receiving a request command, which is a control signal, from the user, and preferably includes an infrared interface unit for receiving an infrared signal input through the remote control device 200 or a local key input unit included in one side of the panel. According, the communication unit 160 receives signals received for the operations of the video display apparatus 100 and control signals for transmitting commands to the portable terminal 300 and the received signals to the control unit 170.

Herein, the remote control device 200 may include various keys which can be used when managing the broadcast contents. The keys may include at least one of a numeric key, a confirmation key, an input mode switching key, a preference channel key, a program information confirmation key, a quick menu key, direction keys (left, right, up, down), conformation key, a click key, a stroll key, a color key, a previous key, a text key, a volume key, and the like.

Meanwhile, the control unit 170 controls the overall operation of the image display apparatus 100. In particular, the control unit 170 can control the apparatus 100 such that the image data received through the interface unit 110 are displayed through the display unit 140, and the pointer generated from the GUI generation unit is displayed on the display unit 140.

Figure 3:
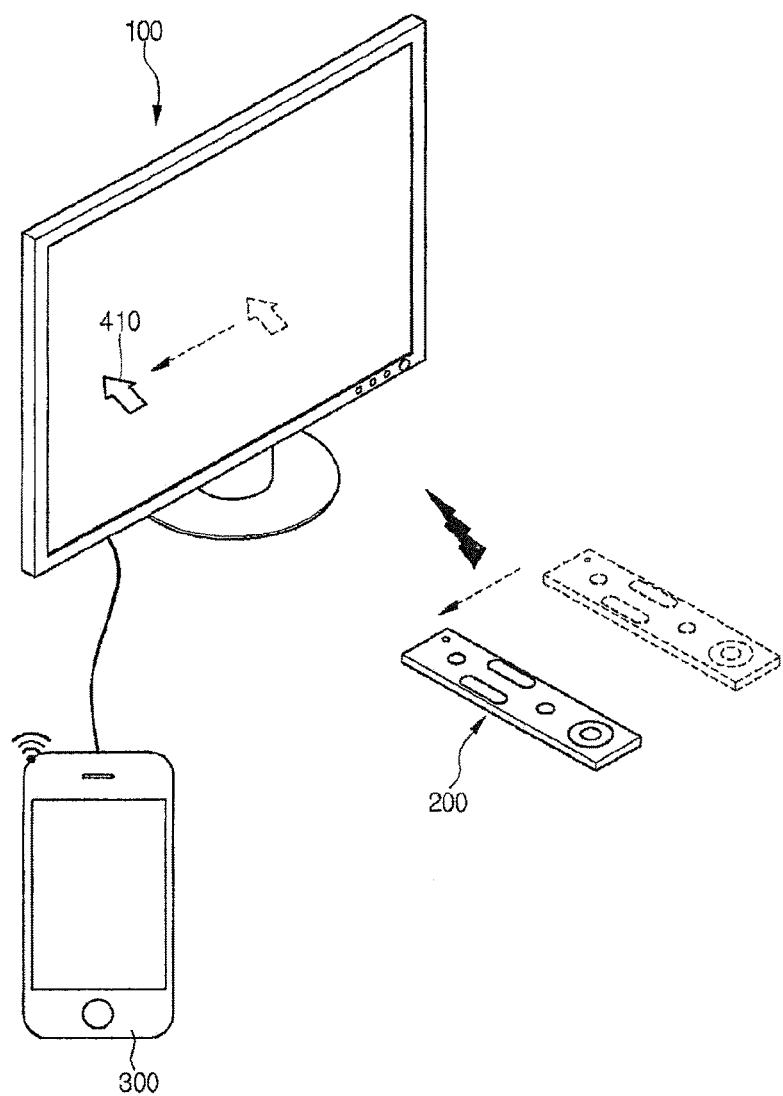
FIGS. 3 to 5 are diagrams illustrating a configuration and its embodiment of a remote control 200 for controlling the operation of the image display apparatus 100 according to an embodiment of the present invention.
Figure 4:
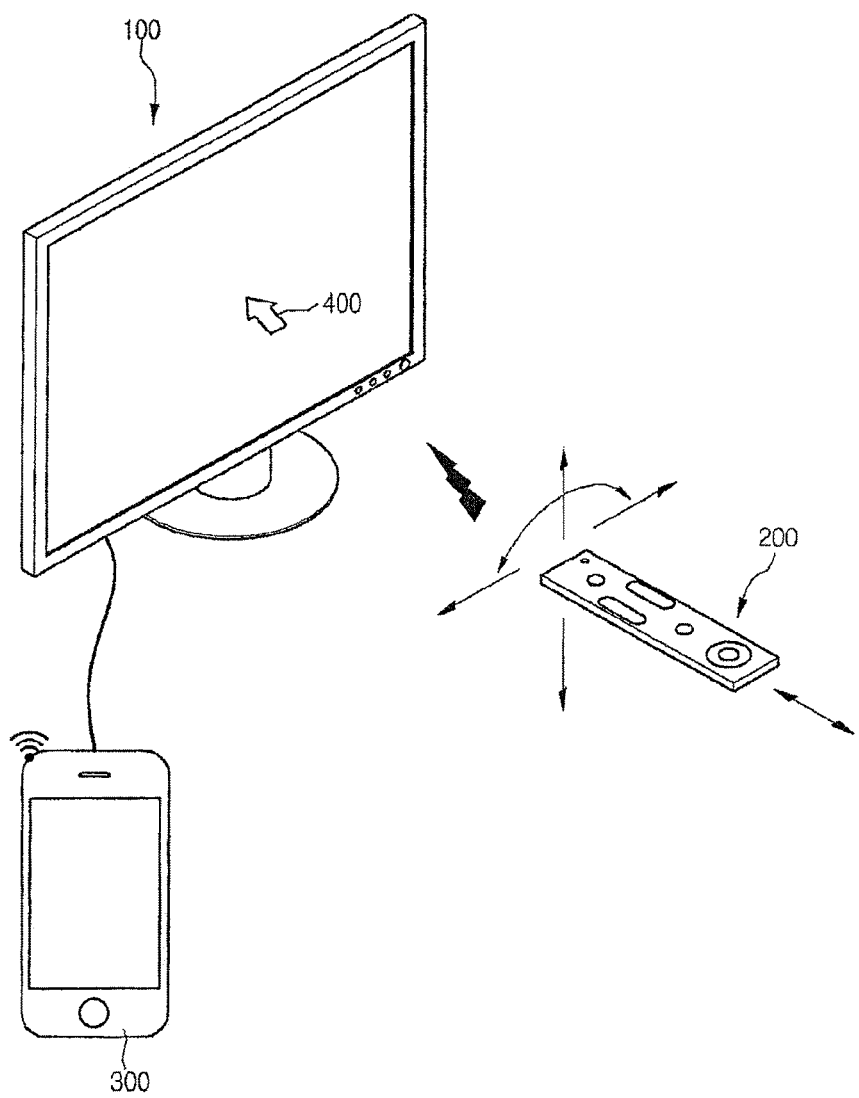
Figure 5:
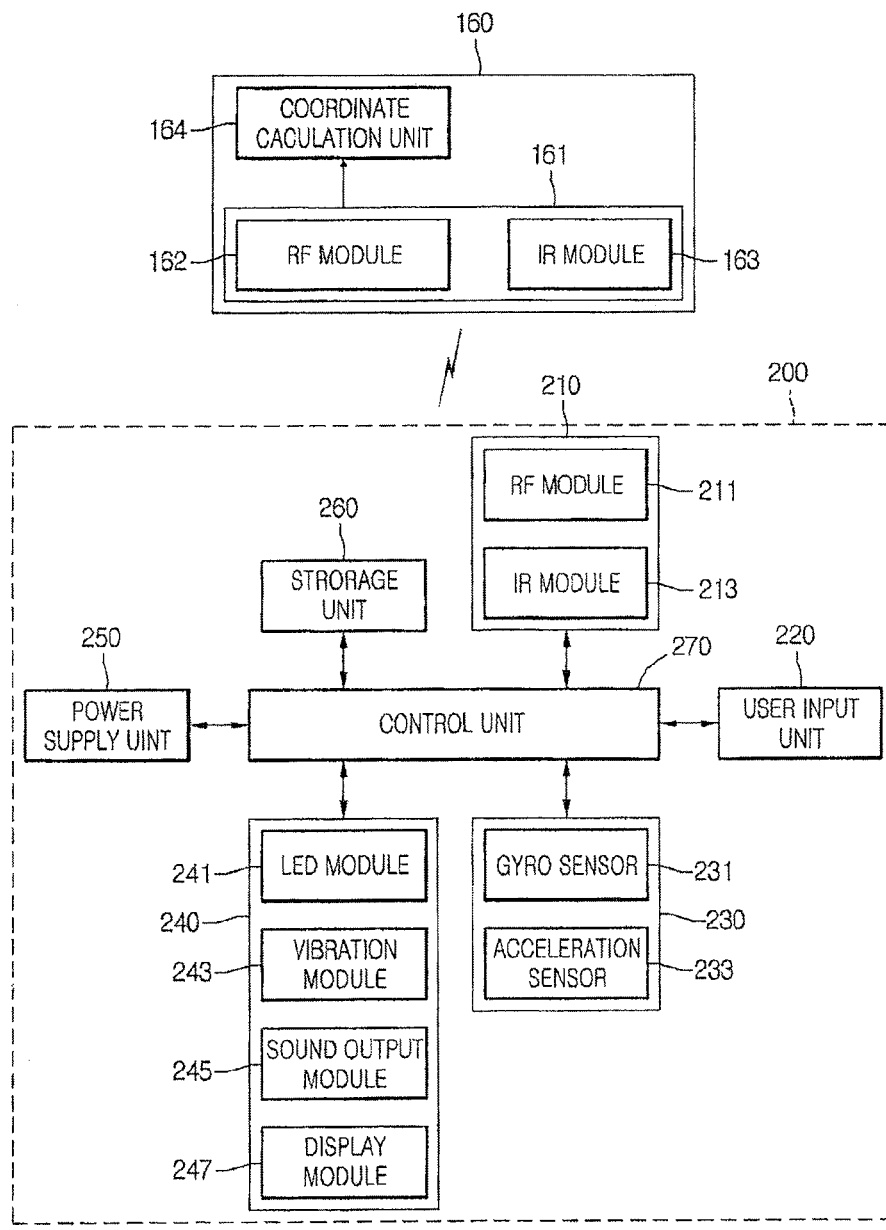

FIGS. 3 to 5 are diagrams for explaining an example of the remote control device 200 for remotely controlling the operation of the image display apparatus 100 connected to the portable terminal 300 according to an embodiment of the present invention.

The remote control device 200 can transmit a control signal to the control unit 170 through a radio signal, which may be a RF signal, an infrared signal, and the like, the interface which is included in the communication unit 160 of the image display apparatus 100. For example, the remote control device 200 may be a remote control responding to the gestures of the user as well as a button input of the user.

In the embodiment, the remote control device 200 can transmit and receive signals according to the image display apparatus 100 and a RF communication standard. In the image display apparatus 100, a pointer 400 can be displayed on a point pointed by the remote control device 200 on the screen of the display unit 140.

The remote control device 200 may be moved or rotated in all directions by the user. The pointer 400 is movably displayed on the screen of the image display apparatus 100 according to the movement of the remote control device 200. FIG. 3 is showing a bar in which the pointer displayed on the image display apparatus 100 is moved corresponding to the movement of the remote control device 200.

As shown in FIG. 3, when the remote control device 200 is moved to the left by the user, a pointer 410 displayed on the screen of the image display apparatus 100 is also moved to the left accordingly. In the embodiment, the remote control device 200 may include a sensor capable of determining its movement. The movement information of the remote control device 200 sensed by the sensor of the remote control device 200 is transmitted to the image display apparatus 100. The image display apparatus 100, e.g., the control unit 170, determines the operation of the remote control device 200 from the movement information of the remote control device 200 to calculate the coordinate values of the pointer 410 accordingly. And based on the calculated coordinate values, the control unit 170 may move the pointer 410 on the screen of the display unit 140.

The sensor capable of determining the movement of the remote control device 200 may use an acceleration sensor, a gyro sensor or a geomagnetic sensor, and such a sensor may be provided in the remote control device 200 and/or the apparatus 100.

FIGS. 3 and 4 are showing an example in which the pointer 410, 400 displayed on the display unit 140 is moved corresponding to the up and down, the left and right or the rotation of the remote control device. The movement speed and/or direction of the pointer 400, 410 may correspond to the movement speed and/or direction of the remote control device 200. For instance, if the remote control unit device 200 is moved to the left in an accelerated speed, then the pointer 410 would also be moved to the left in an accelerated speed accordingly. The pointer 400, 410 is used for the user to make a selection on any item displayed on the display unit 140.

In the embodiment, the pointer displayed on the image display apparatus 100 is set to be moved corresponding to the operation of the remote control device 200. As another example, predetermined commands may be configured to be input to the image display apparatus 100 corresponding to the operation of the remote control device 200. For instance, when the remote control device 200 is moved to the front and the back, a size of the video displayed on the image display apparatus 100 may be enlarged or reduced.

FIG. 5 is showing a block diagram illustrating an example of one configuration of the remote control device 200 for transmitting and receiving signals to and from the communication unit 160 of the image display apparatus 100 of FIG. 2.

Referring to FIG. 5, the communication unit 160 included in the image display apparatus 100 may include a coordinate calculation unit (or coordinate value calculation unit) 164 and a radio communication unit 161. The coordinate calculation unit 164 may be included in the control unit 170 described above. The radio communication unit 161 may include a RF module 162 and/or an IR module 163.

Meanwhile, the remote control device 200 may include a wireless communication unit 210, a user input unit 220, a sensor unit 230, an output unit 240, a power supply unit 250, a storage unit 260 and a control unit 270. All components of the remote control device 200 are operatively coupled and configured.

The radio communication unit 210 transmits and receives signals to and from the image display apparatus 100. In the embodiment, the remote control device 200 may include a RF module 211 which can transmit and receive signals to and from the communication unit (or operation interface unit) 160 of the image display apparatus 100 according to a RF communication standard. In addition, the remote control device 200 may include an IR module 213 which can transmit and receive signals to and from the communication unit 160 of the image display apparatus 100 according to a RF communication standard.

In the embodiment, the remote control device 200 transmits signals including information about the operation of the remote control device 200 to the image display apparatus 100 through the RF module 211. In addition, the remote control device 200 can receive signals transmitted by the image display apparatus 100, through the RF module 211. In addition, the remote control device 200 may transmit commands regarding power on/off, a channel change, a volume change, and the like to the image display apparatus 100 through the IR module 213, if desired.

The user input unit 220 may be configured by keypads and/or buttons. The user may input the commands associated with the image display apparatus 100 to the remote control device 200 by operating the user input unit 220. When the user input unit 220 includes a hardkey button, the user may input the commands associated with the image display apparatus 100 to the remote control device 200 through a push operation of the hardkey buttons. In addition, the user input unit 220 may include input units of various kinds such as a scroll key, a jog key and the like which may be operated by the user, but the embodiment of the present invention is not limited to such.

The sensor unit 230 may include a gyro sensor 231 and/or an acceleration sensor 233 as the movement sensor(s). The gyro sensor 231 may detect the movement of the remote control device 200. For example, the gyro sensor 231 may sense information about the movement of the remote control device 200 based on x, y, and z axes. The acceleration sensor 233 may sense information about the movement velocity of the remote control device 200. The sensor unit 230 can include other type of movement sensor.

The output unit 240 may output video and/or audio signals corresponding to the operations of the user input unit 220 or corresponding to the signals transmitted from the image display apparatus 100. The user may recognize whether the user input unit 220 is operated or whether the image display apparatus 100 is controlled, through the output unit 240. For example, the output unit 240 may include at least one of a lighting LED module 241, a vibrating module 243, an audio output module 245, and a display module (or video output module) 247 for outputting signals when the user input unit 220 is operated, or for processing signals transmitted and received to and from the image display apparatus 100 through the wireless communication unit 210.

The power supply unit 250 supplies power to the remote control device 200. In addition, the power supply unit 250 may not supply power when the remote control device 200 is still or inactive for a predetermined time, such that any waste of power may be reduced. The power supply unit 250 may resume power when a predetermined key provided in the remote control device 200 is operated.

The storage unit 260 may store various types of application data, and the like used to control or operate of the remote control device 200. When the remote control device 200 transmits and receives signals through the image display apparatus 100 and the RF module 211 by a wireless method, the remote control device 200 and the image display apparatus 100 transmit and receive signals through a predetermined frequency band.

The control unit 270 of the remote control device 200 may store information to the storage unit 260 and refer to the information regarding frequency bands, and the like capable of transmitting or receiving signals to and from the image display apparatus 100 paired with the remote control device 200 by a wireless technique.

The control unit 270 of the remote control controls all matters associated with the control of the remote control device 200. The control unit 270 of the remote control device may transmit signals corresponding to predetermined key operations of the user input unit 220 or corresponding to the operations of the remote control device 200 sensed from the sensor unit 230, to the communication unit 160 of the image display apparatus 100 through the radio communication unit 210.

As described above, the image display apparatus 100 may include the wireless communication unit 161 which may transmit and receive signals from and to the remote control device 200 by the wireless technique and the coordinate value calculation unit 164 which calculates the coordinate values of the pointer (e.g., 400) corresponding to the operations of the remote control device 200.

The radio communication unit 161 may wirelessly transmit and receive signals to and from the remote control device 200 through the RF module 211. In addition, the remote control device 200 can receive signals transmitted according to the IR communication standard, through the RF module 211.

The coordinate value calculation unit 164 may modify hand tremors or errors from signals, which are received through the radio communication unit 161, corresponding to the operations of the remote control device 200 to calculate the coordinate values (e.g., x, y; or x, y and z) of the pointer 400 to be displayed on the display unit 140.

In addition, the transmitted signal of the remote control device 200 input to the image display apparatus 100 through the communication unit 160 is sent to the control unit 170 of the image display apparatus 100. The control unit 170 may determine information about the operations and key operations of the remote control device 200 from the signals transmitted from the remote control device 200 and control the image display apparatus 100 and the connected portable terminal 300 accordingly. In the present invention, the portable terminal 300 can be connected to the apparatus 100 via a wire or wirelessly.

Meanwhile, the image display apparatus 100 and the remote control device 200 as described above are only an example of the present invention, such that some of the shown components may be integrated, added or omitted, depending on certain aspects of the actually implemented image display apparatus 100.

For instance, the image display apparatus 100 may be configured to integrate two or more components into one component or subdivide one component into two or more components, as desired. In addition, since the functions performed by each block are intended to describe an example of the present invention, the scope of the present invention is not limited to the specific operation or devices.

Hereinafter, the image display method according to a first embodiment of the present invention will be described with reference to FIGS. 6 to 13. The methods of FIGS. 6 to 13 as well as other methods described below according to the present invention can be implemented in any device/system described above and below including the apparatus 100 and the remote control device 200 of FIGS. 1-2 and 5, or in other suitable device/system according to the present invention.

Figure 6:
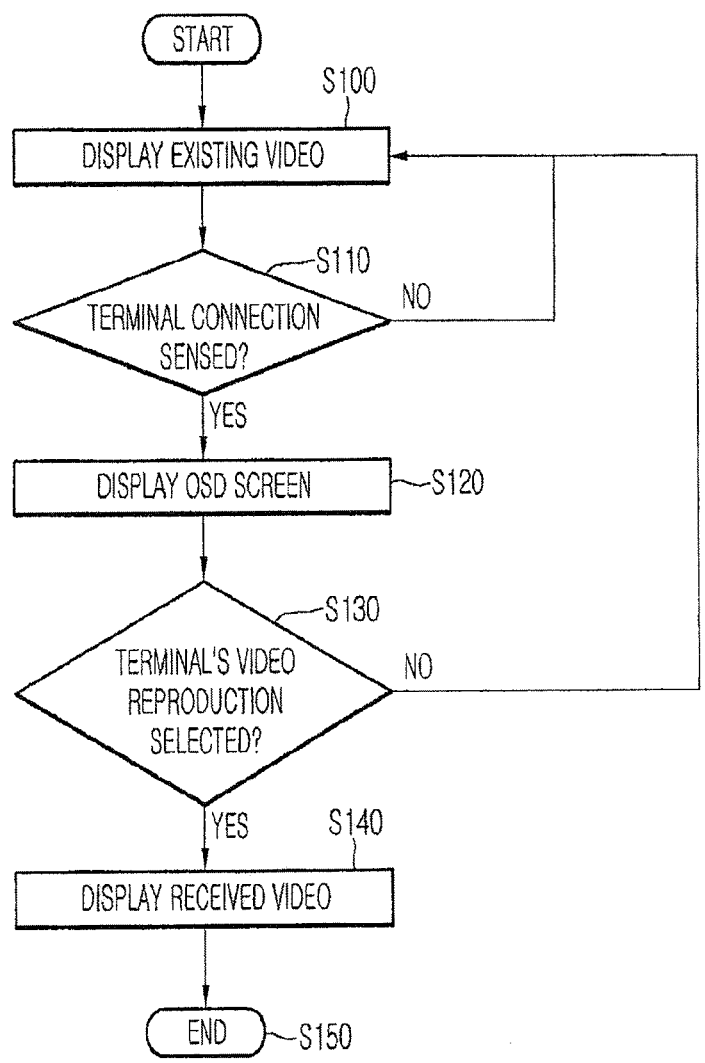
FIG. 6 is a flow chart showing an image display method according to an embodiment of the present invention.
Figure 7:
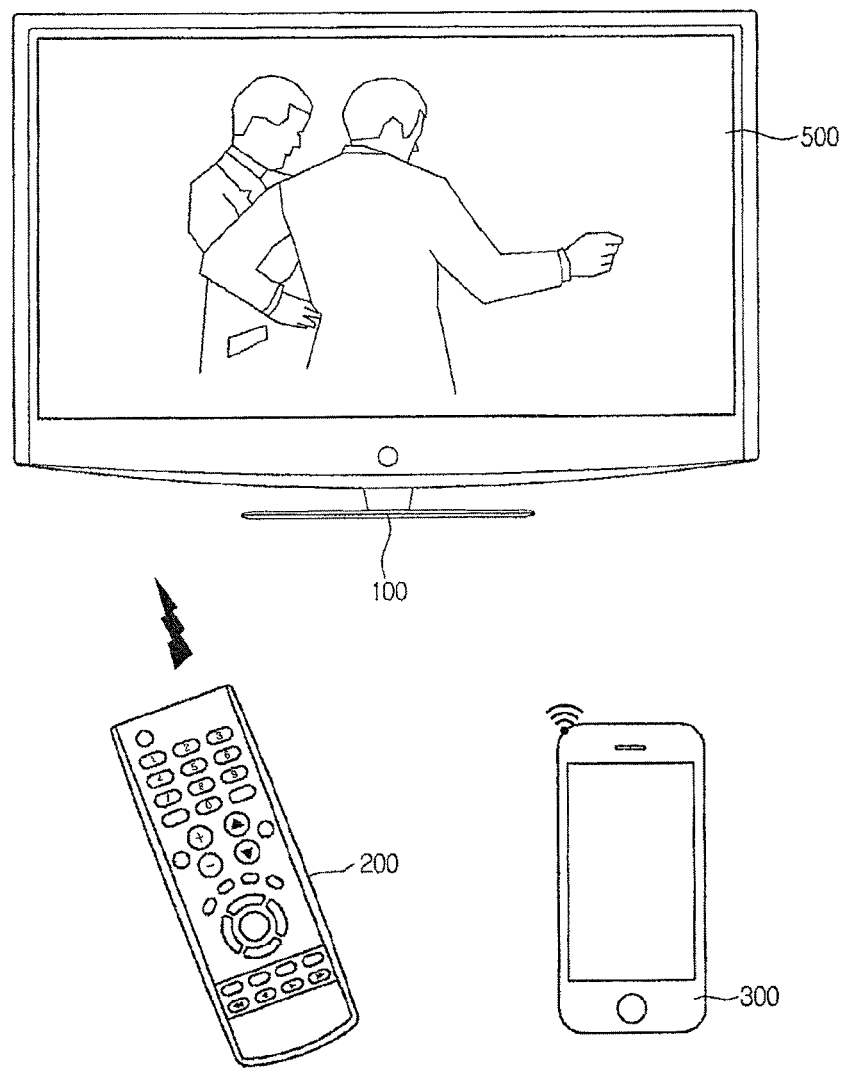
FIG. 7 is diagram illustrating an example of a situation before connecting the image display apparatus 100 to the portable terminal 300 according to an embodiment of the present invention.

Referring to FIGS. 6 and 7, first, the image display apparatus 100 displays an existing image such as a video 500 of the image display apparatus 100 (S100). The existing video 500 may be a broadcast data/video received by a tuner included in the inner or external apparatus of the image display apparatus 100. Here, FIG. 7 is diagram illustrating a situation before connecting the image display apparatus 100 to the portable terminal 300, as an example. On the image display apparatus 100, a terrestrial video 500 and the like received through the tuner of the apparatus 100 may be displayed on the screen of the display unit 140.

In addition, a menu screen may be displayed on the portable terminal 300. Since the portable terminal 300 and the video display apparatus 100 are not connected to each other at this time, the screen having the video 500 of the image display apparatus 100 and the screen of the portable terminal 300 are not synchronized with each other and display different contents.

Hereafter, the portable terminal 300 determines whether the image display apparatus 100 is connected through the interface unit 110 (S110). As a variation, the image display apparatus 100 may detect whether or not the portable terminal 300 is connected to the apparatus 100.

Figure 8:
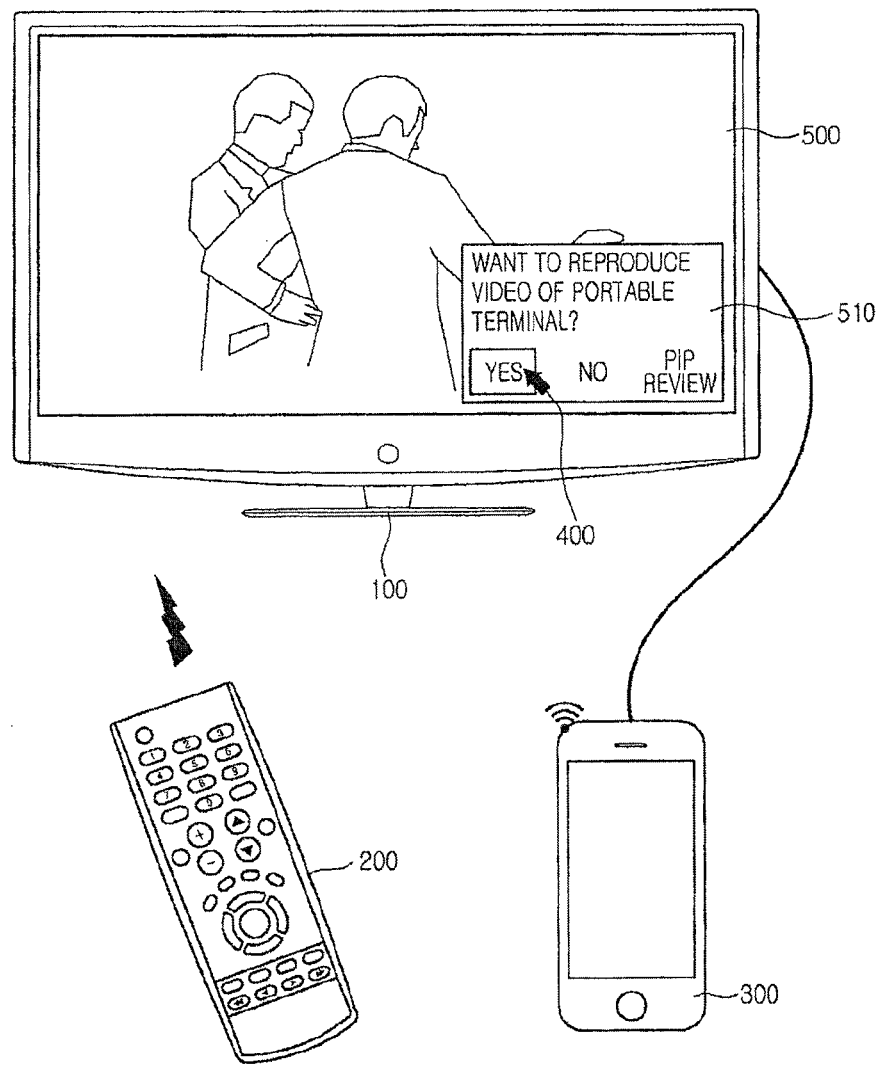
FIG. 8 is a diagram illustrating an example of an OSD screen according to an embodiment of the present invention.

Once the connection is detected, an OSD screen, which allows the user to select whether or not to reproduce the video of the portable terminal 300 on the screen of the image display apparatus 100, is displayed over the existing video 500 being displayed on the screen (S120). FIG. 8 shows this example.

Particularly, FIG. 8 is showing that a screen/window 510 which requests the user whether the video of the portable terminal 300 is to be reproduced on the portion of the screen of the display unit 140 is displayed, as an embodiment of the OSD. Herein, the OSD screen 510 may further include a menu setting for deciding whether to display the video of the portable terminal 300 on a sub screen, that is, a picture in picture (PIP) screen on the screen of the display unit 140 of the apparatus 100. The user can use the pointer 400 to select to display the video from the portable terminal 300 on the apparatus 100's screen, as well as a display manner, e.g., PIP review.

Figure 9:
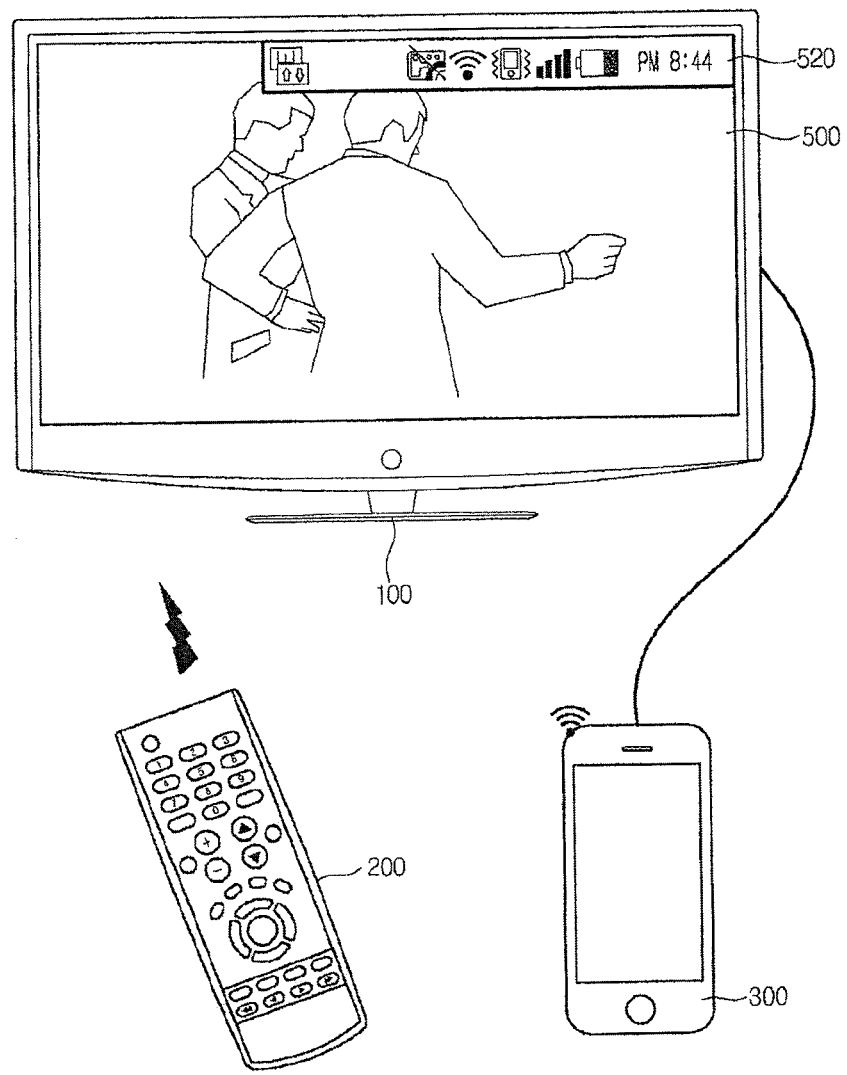
FIG. 9 is a diagram illustrating an example of an indicator 520 according to an embodiment of the present invention.

In addition, when the portable terminal 300 is connected with the apparatus 100, an indicator 520 using the OSD as shown in FIG. 9 may be displayed over the existing video 500 currently being displayed on the image display apparatus 100, and the indicator 520 indicates that the current portable terminal 300 is connected with the apparatus 100. FIG. 9 is showing a method in which the indicator 520 is displayed on the top of the video being displayed in the form of a bar. By displaying the indicator 520, the user may be provided with the information capable of determining the state of the portable terminal 300, and a message in which the video of the terminal 300 can be reproduced may be displayed accordingly.

Meanwhile, the user can select a menu that the user wants on the OSD screen 510 setting the video reproduction of the portable terminal 300. The menu selection on the screen of the apparatus 100 can be done through the remote control device 200, and the selection of a desired item is possible by moving the pointer 400 to the menu/item that the user wants to select or by using the up, down, left and right keys on the remote control device 200 or other input means.

In this example if the user selects 'no' on the OSD screen 510 of FIG. 8 using the remote control device 200 or the like, the OSD screen disappears, and the existing video 500 may be maintained and continuously reproduced On the other hand, if the user selects "yes" or PIP on the OSD screen 510 of FIG. 8 (S130), the video signal from the portable terminal 300 is received through the interface unit 110, the received video signal is displayed on the entire screen of the display unit 140 of the apparatus 100 or on a portion which is a sub screen of the entire screen of the display unit 140 (S140).

Figure 10:
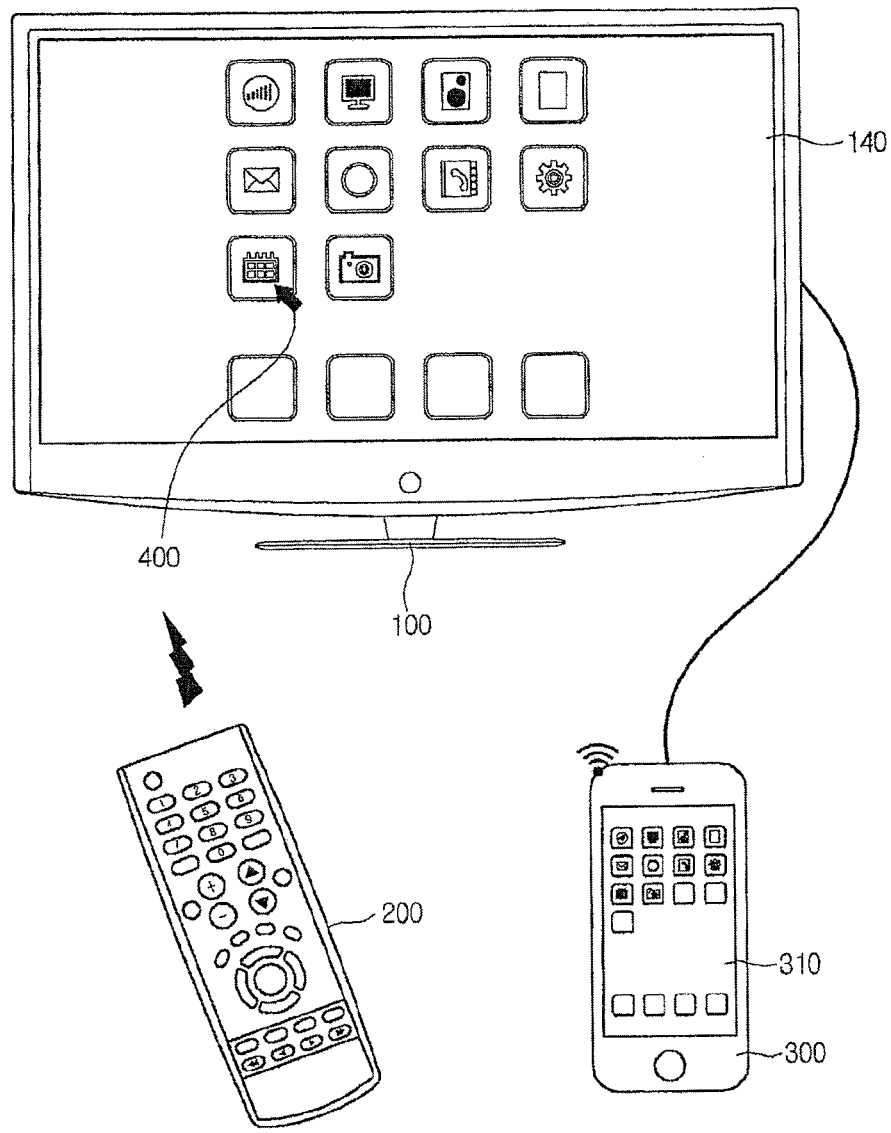
FIG. 10 is a diagram illustrating a case of displaying a screen of the portable terminal 300 as a full screen on a screen of the image display apparatus 100, according to an embodiment of the present invention.
Figure 11:
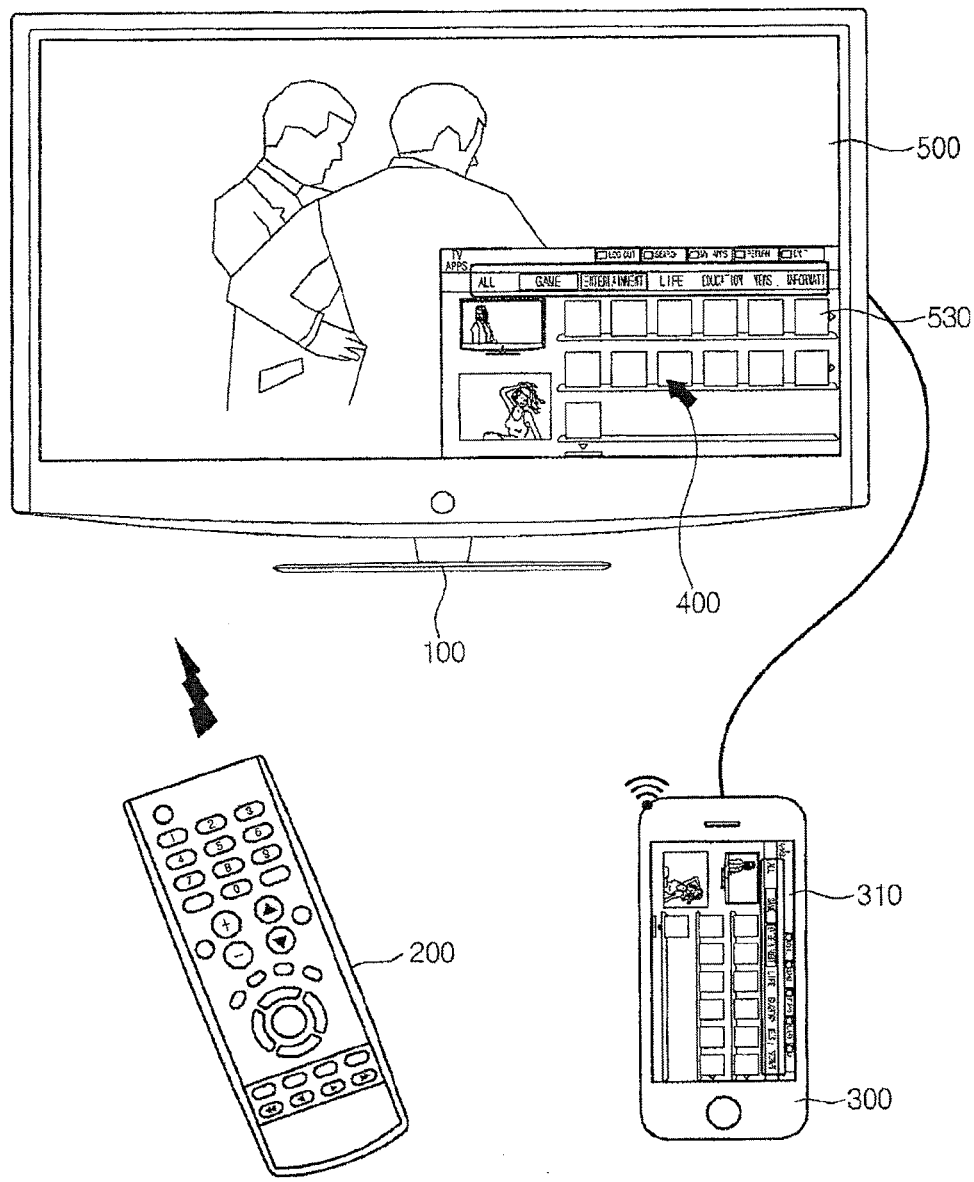
FIG. 11 is a diagram illustrating a case of displaying a screen of the portable terminal 300 as a PIP screen on a screen of the image display apparatus 100, according to an embodiment of the present invention.

As shown in FIG. 10, a menu screen 310 of the portable terminal 300 may displayed on the entire screen of the display unit 140 of the image display apparatus 100, or the screen image of the portable terminal 300 may displayed on a sub screen image 530, e.g., a picture in picture screen image 530 as shown in FIG. 11. In these ways, the image currently being displayed on the portable terminal 300 is simultaneously and synchronously displayed on the screen of the apparatus 100. Then the user can use the pointer 400 to select a desired item/function by which the desired item/function is performed in the portable terminal 300 and/or in the apparatus 100.

Once "yes" or PIP on the OSD screen 510 of FIG. 8 is selected by the user, the video/image signal from the portable terminal 300 is automatically transmitted to the apparatus 100. The video signal may be a video displayed on the portable terminal 300 and then the several of videos reproduced on the portable terminal 300 may be transmitted to and displayed on the image display apparatus 100.

In addition, since the aspect ratios of the portable terminal 300 and the image display apparatus 100 may be different from each other, the portable terminal 300 may transmit to the image display apparatus 100 a video already adjusted according to the aspect ratio of the image display apparatus 100. For example, if a ratio of the width and the length of the screen of the portable terminal 300 is 3:4 and a ratio of the width and the length of the screen of the image display apparatus 100 is 16:9, the video reproduced on the portable terminal 300 is enlarged according to the 16:9 screen or the 3:4 screen video is displayed in the 16:9 screen, or a video adjusted in form of a letterbox adding a black screen to the left and the right blanks may be transmitted to the image display apparatus 100. As a variation, the portable terminal 300 may transmit the video of the terminal 300 in its original format to the apparatus 100 which then converts the received video into a format more suitable for the display unit 140 of the apparatus 100.

In addition, the portable terminal 300 may be a terminal which can be connected to the Internet or other network and accordingly, a video received from the portable terminal 300 may also include several of contents according to the Internet connection. For example, as shown in FIG. 11 a video 530 of the portable terminal 300 reproduced on the image display apparatus 100 may be an Internet broadcast screen/website reproduced on the portable terminal 300, and the video 530 may be several of the documents on the Internet, screens of the Internet browser, social network game play screens, Internet videos, various images, etc. Again, the video 530 can be displayed on only a portion of the screen of the display unit 140 or on the entire screen of the display unit 140.

FIGS. 12 to 15 are diagrams illustrating examples of a screen where a video of the portable terminal 300 is reproduced on the image display apparatus 100 as described above.

Figure 12:
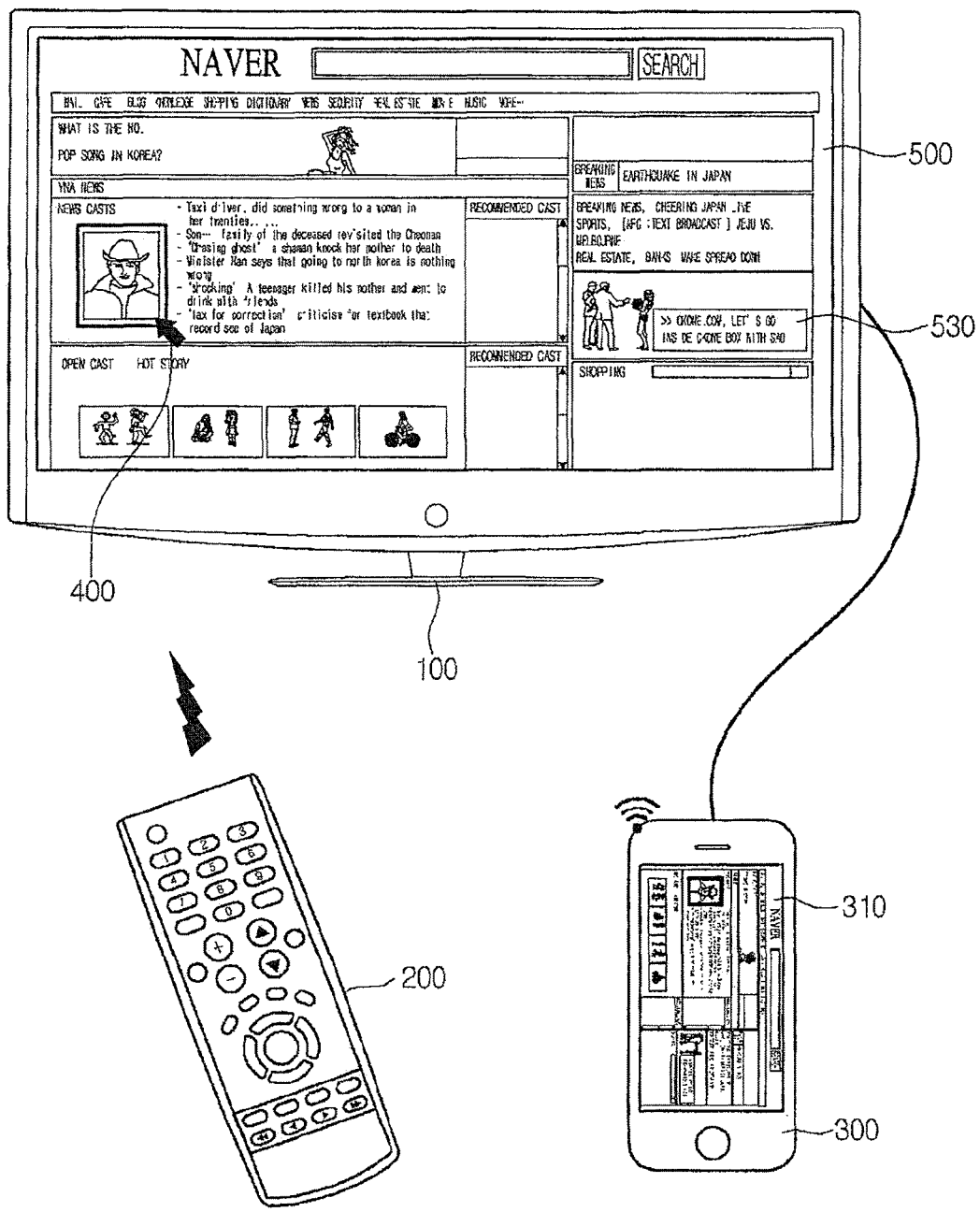
FIGS. 12 to 15 are diagrams illustrating cases where an image from the portable terminal 300 is each displayed on the image display apparatus 100 according to an embodiment of the present invention.
Figure 13:
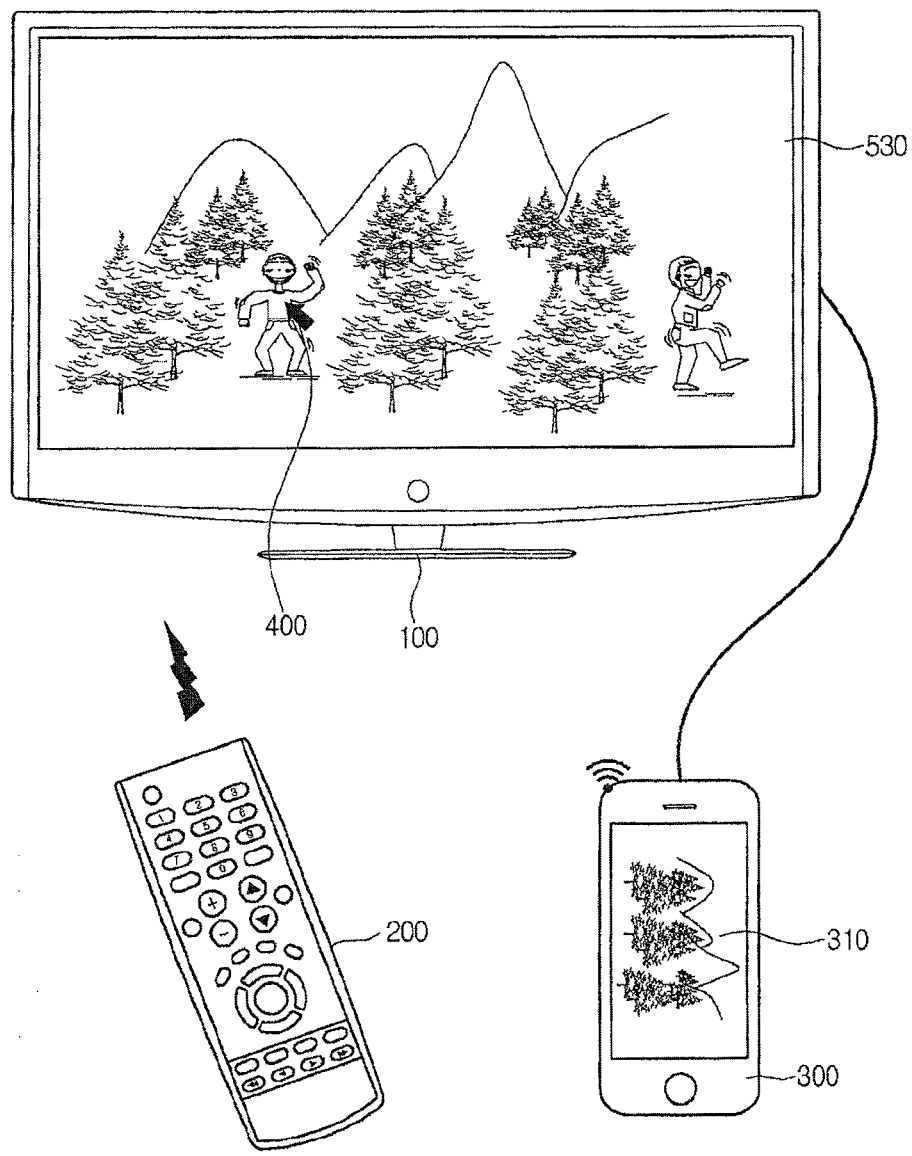
Figure 14:
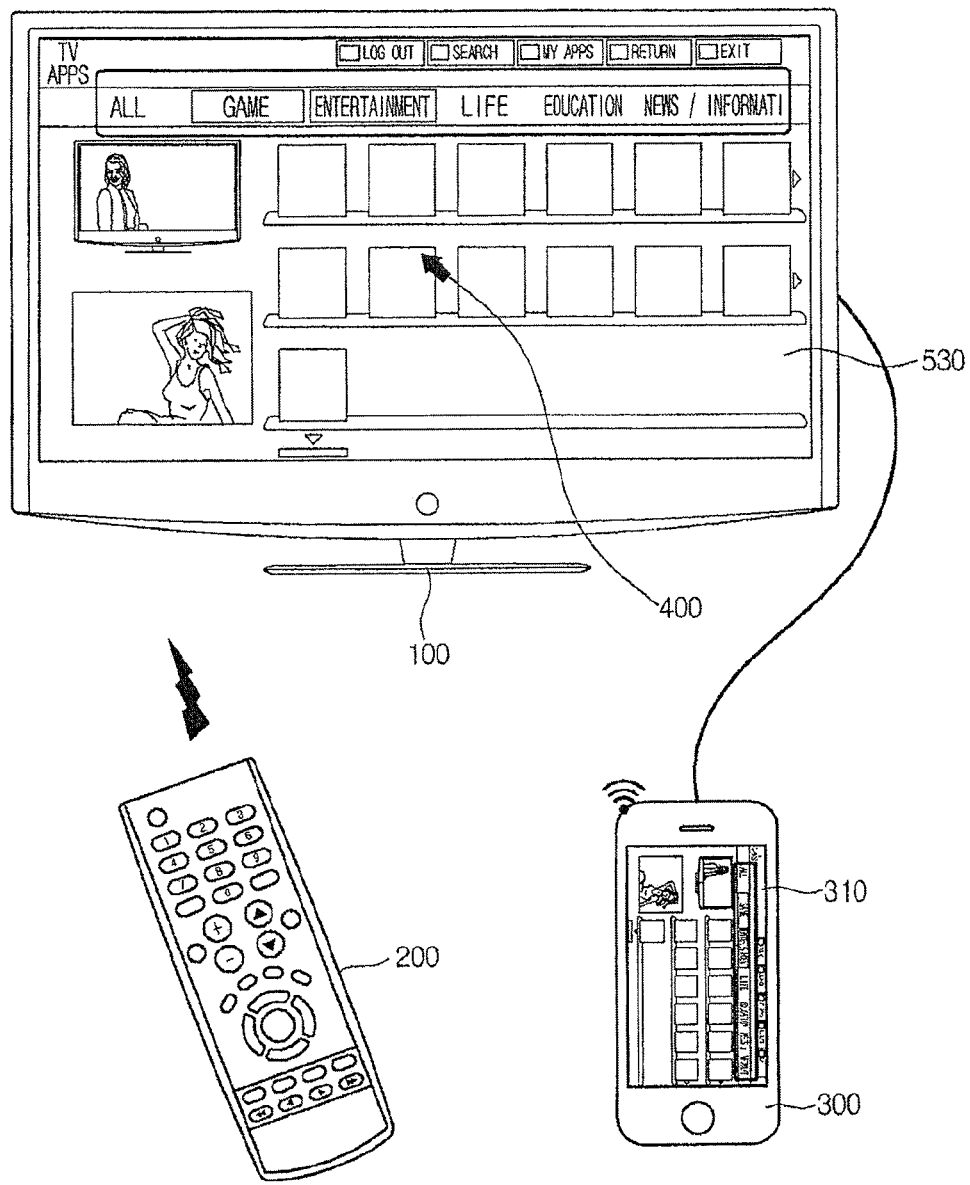
Figure 15:
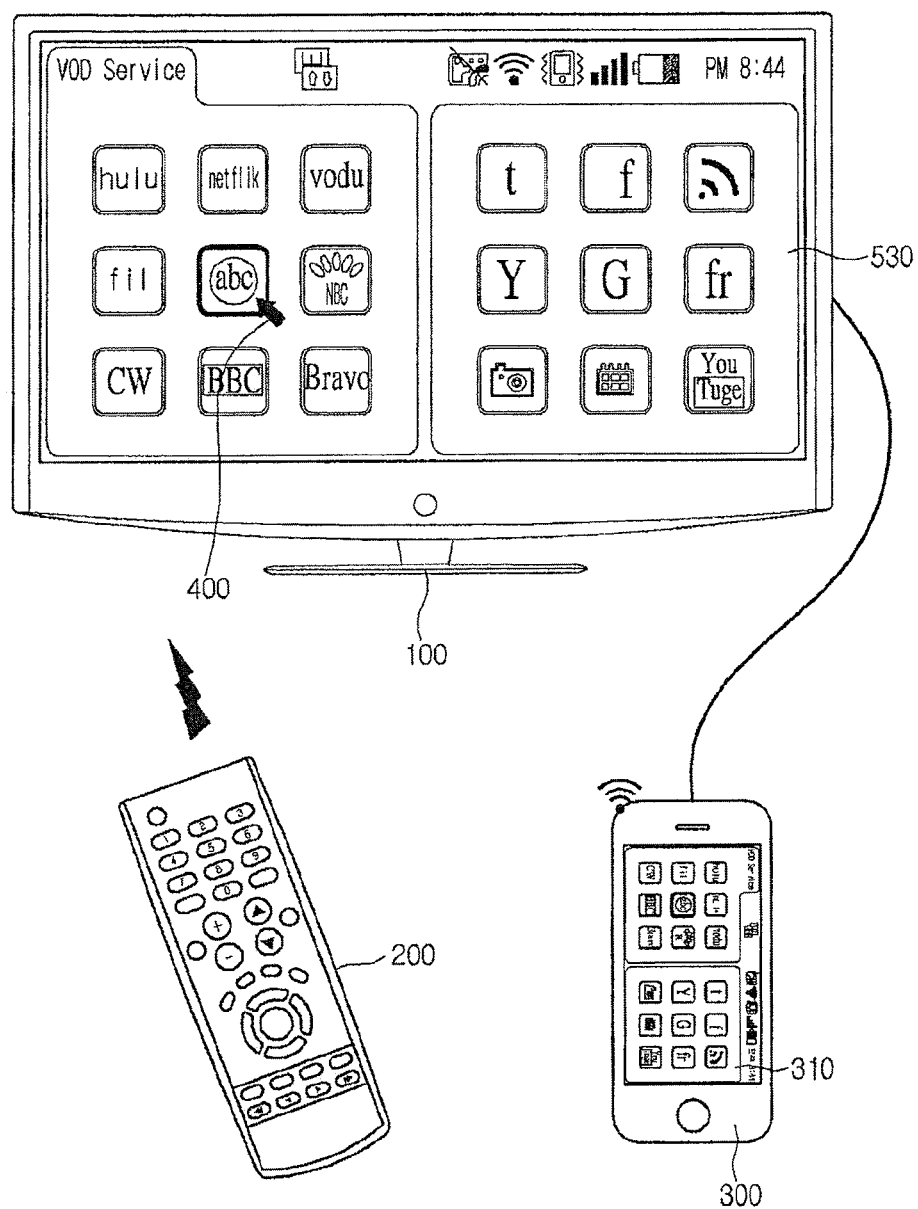

FIG. 12 is showing an example in which an Internet screen image is received from the portable terminal 300 and is displayed on the image display apparatus 100 connected to the portable terminal 300, and FIG. 13 is showing an example in which a video displaying a social network game is received and then displayed on the apparatus 100 connected to the portable terminal 300. FIG. 14 is showing an example in which an Internet broadcast selection screen image received from the portable terminal 300 is displayed on the image display apparatus 100 connected to the portable terminal 300, and FIG. 15 is showing an example in which a menu selection screen image of the portable terminal 300 is displayed on the image display apparatus 100 connected to the portable terminal 300. In all these examples, the image currently being displayed on the portable terminal 300 may be automatically and synchronously displayed on the screen (e.g., on the entire screen or a portion thereof) of the apparatus 100 after the user's authorization for such displaying. Further such images may be continuously updated in that the synchronization of the images being displayed on the apparatus 100 and terminal 300 may occur continuously. And by manipulating the items displayed on the screen of the apparatus 100, the user can control the operations of the portable terminal 300.

Herein, the pointer 400 generated by the GUI generation unit 130 is displayed on the screen image 530 of the portable terminal displayed on the display unit 140, together. The pointer 400 functions to enable the operations of the portable terminal 300 when the image display apparatus 100 is connected to the portable terminal 300. For example, the operation of the interface included in the portable terminal 300 can be replaced by operating the pointer 400 displayed on the image display apparatus by the remote control device 200.

The pointer 400 may be moved by the remote control device 200, which is the remote control device, as described above and according to the selection by the pointer 400, the function of the portable terminal 300 is performed. As a result, the user may confirm a change of the video indicated on the portable terminal 300 through the screen image synchronized on the display unit 140 of the image display apparatus 100. For instance, the user can know any image changes that are occurring for the portable terminal 100 by viewing the changes on the image display apparatus 100.

Figure 16:
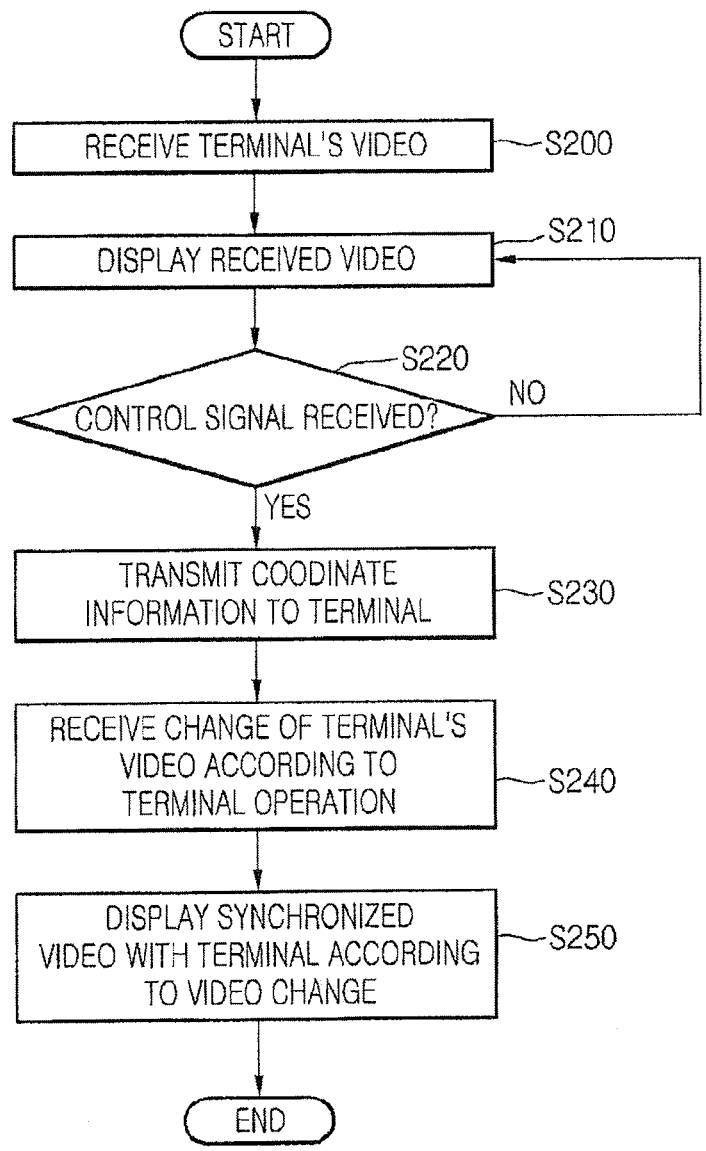
FIG. 16 is a flow chart showing an image display method according to another first embodiment of the present invention.

FIG. 16 is a flow chart showing an image display method according to another first embodiment of the present invention.

This embodiment of the image display method according to the present invention will be described with reference to FIG. 16. First, the image display apparatus 100 receives an image such as a video reproduced on the portable terminal 300 from the portable terminal 300 connected to the apparatus 100 (S200). The image may be previously reproduced or currently being reproduced on the portable terminal 300.

Next, the received image such as the received video is displayed on the display unit 140 (S210). In this case, the received image such as the video includes a screen image reproduced on the portable terminal 300 as described above. Therefore, the image may include various images such as videos reproduced on the portable terminal, e.g., the Internet broadcast screen image, games, menu selection screen images of the portable terminal 300 and the like.

Hereafter, a control signal including the movement information of the remote control device 200 may be received by the apparatus 100 (S220). The control signal may include coordinate information by a space operation of the remote control device 200 and may include various key signals and movement sensing information.

Hereafter, the control unit 170 determines whether the control signal from the remote control device 200 is received (S220). Once the control signal is received, the control unit 170 transmits the control signal including the received coordinate information to the connected portable terminal 300 through the interface unit 110 (S230). The coordinate information transmitted from the apparatus 100 to the portable terminal 300 may include coordinate values calculated according to the coordinate information of the pointer 400 displayed on the image display apparatus 100 and the key operation signal of the remote control device 200

Then the portable terminal 300 performs an Internet/network connection operation corresponding to the received control signal and coordinate information, and then the video to be displayed on the screens may be changed accordingly. More specifically, when the video of the portable terminal 300 is changed due to, e.g., the user's selection of a specific TV program of the portable terminal 300 displayed on the display unit 140, various functions including the Internet connection operation of the portable terminal 300 can be performed according to the received commands in the portable terminal 300 and then the change of the screen image to be displayed on the portable terminal 300 is generated accordingly.

For example, an operation pertaining to the Internet browser may be performed on the portable terminal 300, or the Internet games or a video telephony may be performed on the terminal 300, or a real time broadcast over the Internet and the like may be reproduced. A specific operation of the terminal 300 that the user selects on the screen of the apparatus 100 can cause the images being synchronously displayed on the screens of the apparatus 100 and terminal 300 to be changed.

Next, as a result of the function/operation performed in the portable terminal 300 according to the coordinate information of the current position/selection of the pointer, the terminal 300's image/video may be changed and the terminal's changed video is then sent from the terminal 300 to the apparatus 100 (S240). On the other hand, if the terminal 300's video is not changed, the existing video may be displayed as it is without the change on the apparatus 100. However, if the terminal's changed video is received by the apparatus 100, the control unit 170 receives the terminal's changed video through the interface unit 110 from the portable terminal 300 and displays the terminal's changed video on the display unit 140 in synchronization with the changed video being displayed on the terminal 100 (S250).

Meanwhile, the Internet connection operation corresponding to the pointer's coordinate information transmitted to the portable terminal 300 may be performed by using click, touch, drag and scroll commands at a specific location of the portable terminal 300 corresponding to the coordinate(s) of the pointer 400 displayed on the display unit 140 of the image display apparatus 100.

In addition, when the user moves the remote control device 200 up and down, left and right and front and back while pressing the operation key of the remote control device 200, the communication unit 160 receives this movement information from the remote control device 200, and the control unit 170 may transmit this movement information and the coordinate information of the pointer 400 displayed on the display unit to the portable terminal 300 connected to the apparatus 100.

The portable terminal 300 performs the Internet connection operation or other operations of the portable terminal 300 by performing drag, scroll, screen enlarge or reduction commands at the specific location corresponding to the received coordinate information.

Figure 17:
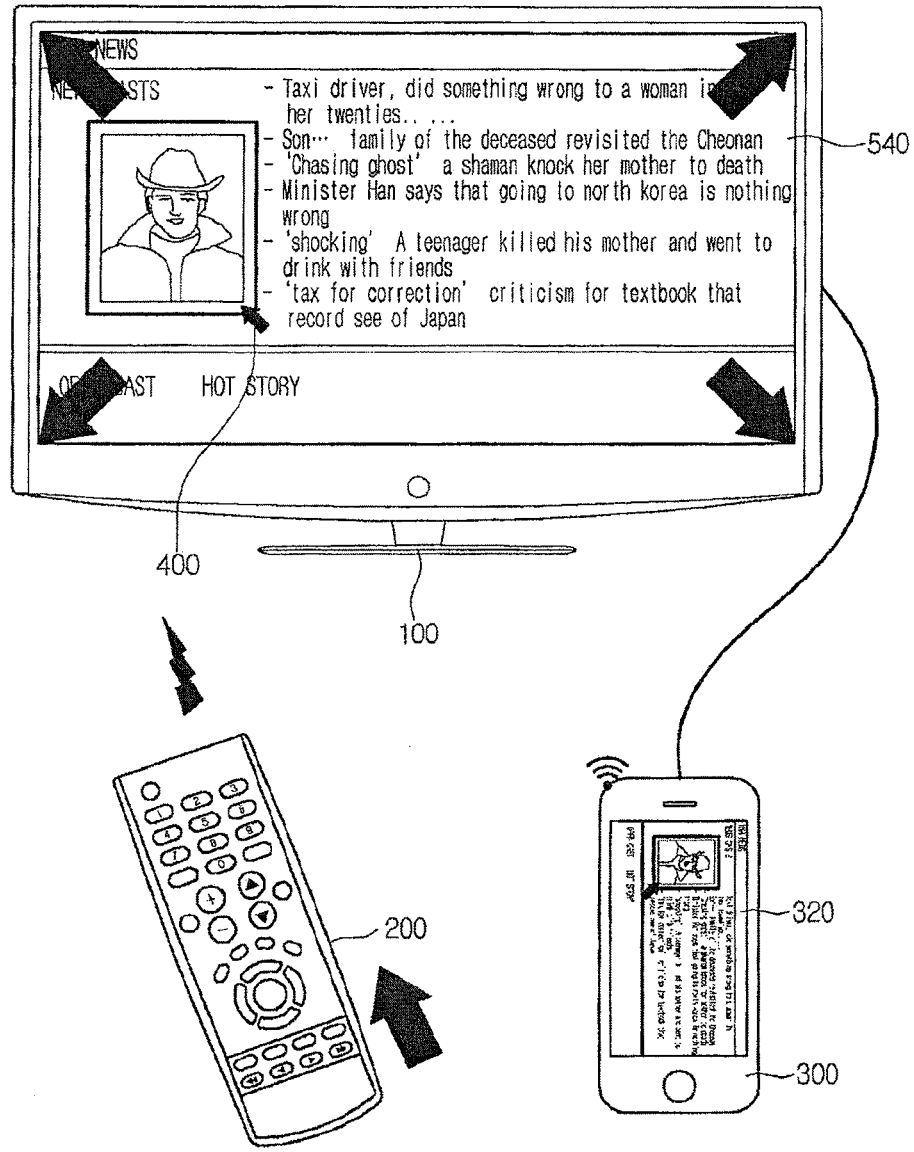
FIG. 17 is a diagram illustrating a process that a command to enlarge an image using a pointer 400 located on the image display apparatus 100 is performed in the portable terminal 300 according to an embodiment of the present invention.

FIG. 17 is a diagram illustrating a process that a command to enlarge a portion of a pointer 400 located on the screen of image display apparatus 100 is performed in the portable terminal 300.

In addition, the image display apparatus 100 may transmit to the portable terminal 300 a command for performing the enlargement or reduction functions of the portable terminal 300 as well as the coordinate information of the pointer 400. The process as an example is performed as follow. The user moves the remote control device 200 forward while the pointer 400 is on the displayed image. Then the control signal including the sensing information and coordinate information based on this movement is transmitted from the remote control device 200 to the image display apparatus 100. The image display apparatus 100 interprets this movement as a screen enlargement command and may then generate the screen enlargement command based on the received coordinate of the pointer 400, which is then transmitted to the portable terminal 300 through the interface unit 110. Here moving the pointer forward is designed as an image enlargement command. However, this is merely an example and any designed pointer movement/operation can be set as any predetermined command.

The portable terminal 300 receives the enlargement command, executes the enlargement command and thus enlarges its screen 320. The enlarged screen 320 image is simultaneously transmitted to the image display apparatus 100, which is then displayed on the apparatus 100. Accordingly, the image display apparatus 100 displays a screen image 540 synchronized with that of the portable terminal 300, and the user may confirm that the screen image 540 is synchronized with the portable terminal 300 by being enlarged, and then the enlarged screen image 540 is displayed on the display unit 140 of the image display apparatus 100. The pointer 400 shown on the screen of the apparatus 100 can also be shown on the screen 320 of the terminal 300 connected to the apparatus 100. As such, all images being displayed on the screen of the terminal 300 may be simultaneously and synchronously displayed also on the screen of the apparatus 100.

Figure 18:
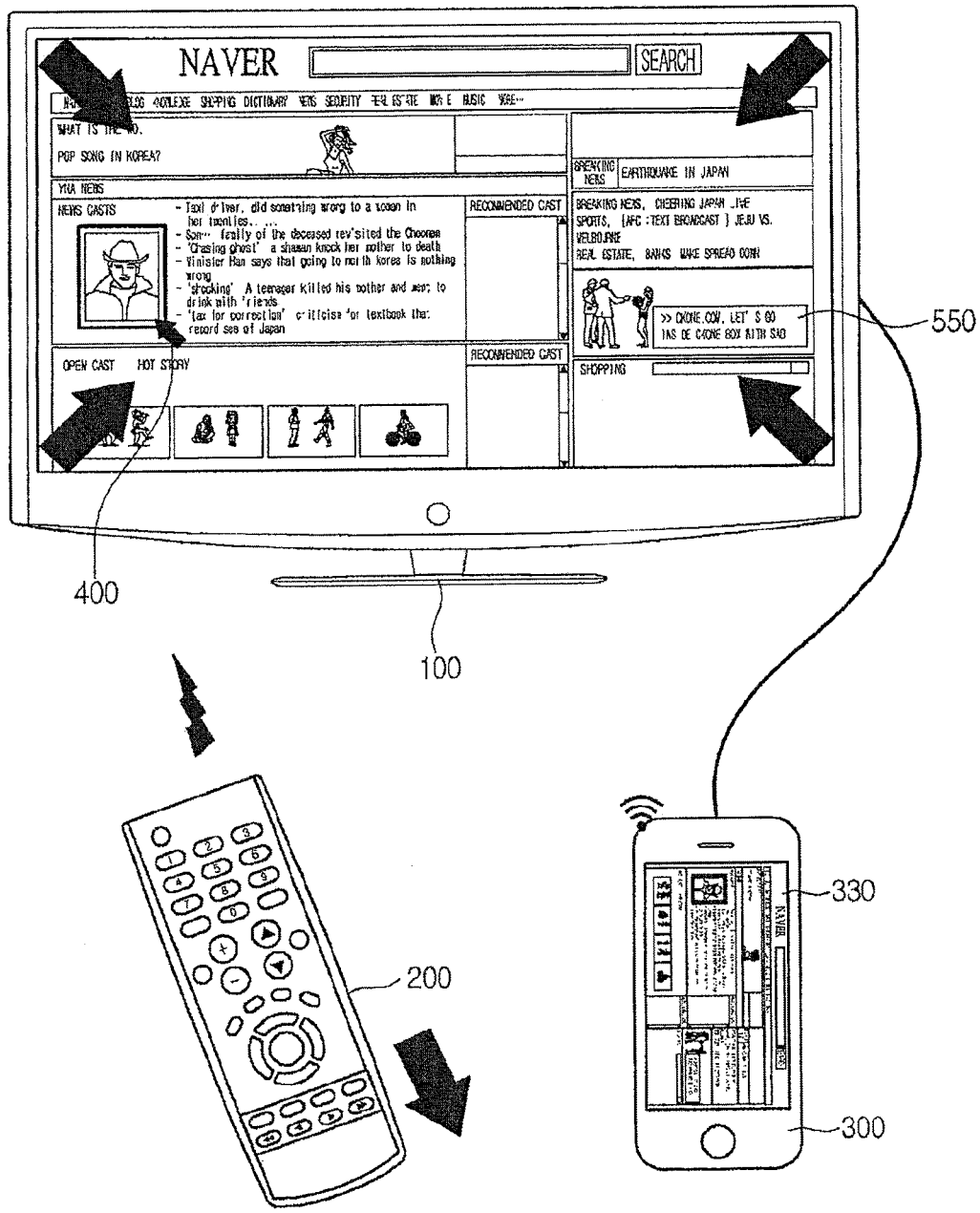
FIG. 18 is a diagram illustrating a process that an image reduction command is performed according to an embodiment of the present invention.

FIG. 18 is showing an example of an image reduction process as opposed to the image enlargement process of FIG. 17, where the image reduction process is the same as the image enlargement process, except that the remote control device 200 is moved backwardly to designate the image reduction command. The image reduction command of the screen based on the point on which the pointer 400 is located is transmitted to the portable terminal 300 from the apparatus 100, and accordingly the user may confirm that the reduced screen 330 of the portable terminal 300 is again transmitted to the image display apparatus 100 and a screen image 550 is displayed on the display unit 140.

Figure 19:
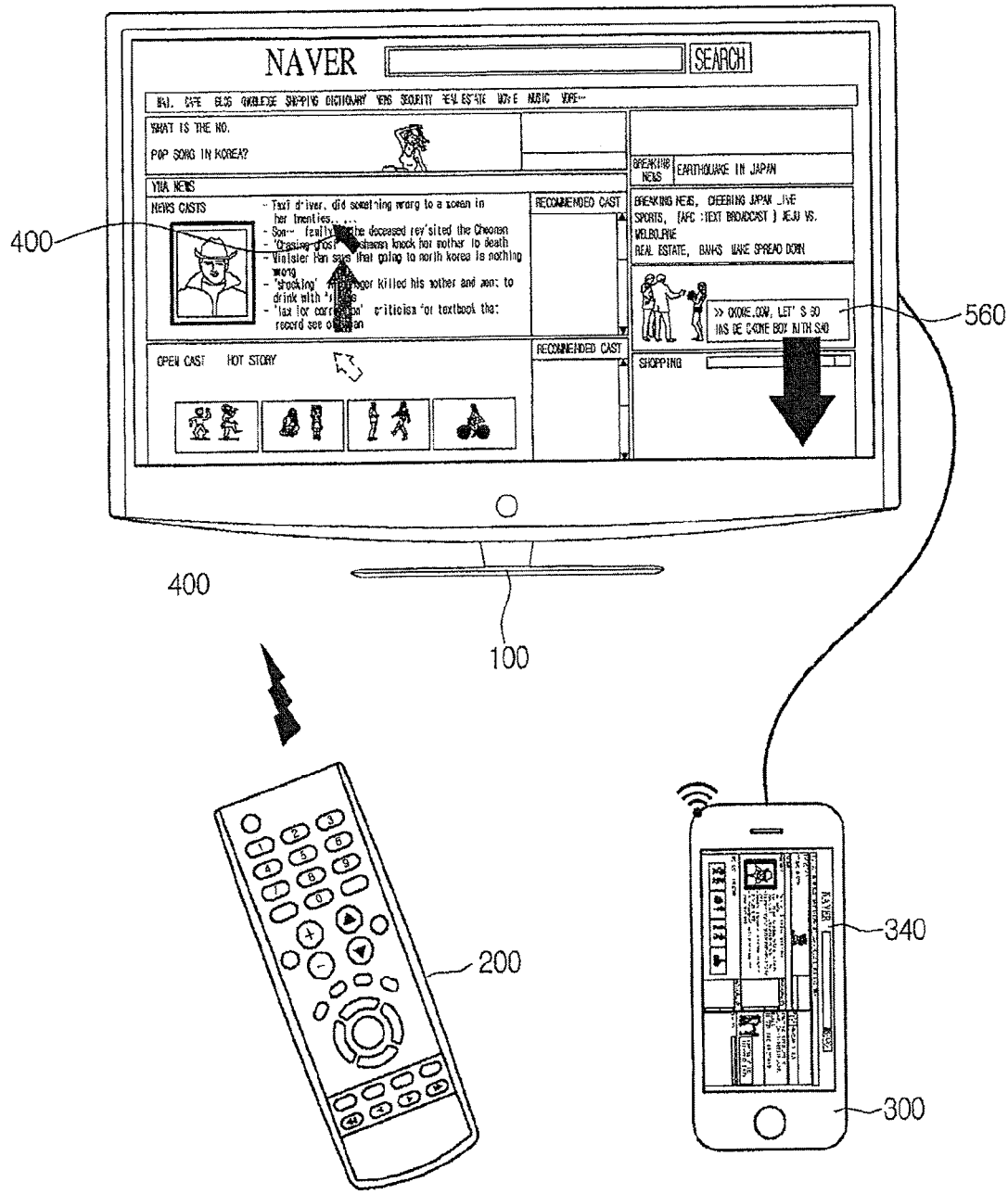
FIG. 19 is a diagram illustrating a process that a screen is scrolled according to an embodiment of the present invention.

FIG. 19 is a diagram illustrating an example of a process where the screen of the apparatus 100 as well as the screen of the terminal 300 are scrolled in synchronization by using the remote control device 200. The portable terminal 300 may display Internet documents on its screen and accordingly the screen of the Internet document is also displayed on the image display apparatus 100 according to the present invention.

Herein, the pointer 400 may be moved toward the top of the screen of the apparatus 100 by the user while clicking or pressing on a confirmation button at a point where the pointer 400 is located. When being moved up, down, left and right directions while clicking on the pointer 400 over the document, the document scroll command for that document may be generated in the portable terminal 300.

For example, the control unit 170 transmits the control signal including the coordinate information of the pointer 400 to the portable terminal 300. The portable terminal 300 interprets them as a command indicating that the document is to be scrolled by a predetermined interval according to the coordinate values corresponding to the coordinate information of the pointer. Then the screen of the terminal 300 is moved according to the scrolling command and the changed video 340 is displayed.

The video changed according to the scroll command is also transmitted from the terminal 300 to the image display apparatus 100, which is then displayed on the screen of the apparatus 100. The user may confirm the synchronized screen according to the changed video of the terminal 300 on the screen of the image display apparatus 100.

Meanwhile, the portable terminal 300 may include a touch screen. In this case, the portable terminal 300 may perform functions by interpreting the control signal including the pointer coordinate information received from the image display apparatus 100 as commands corresponding to touch inputs at the specific locations on the touch screen of the portable terminal 300 or gesture inputs such as a drag and drop set in the portable terminal 300.

Figure 20:
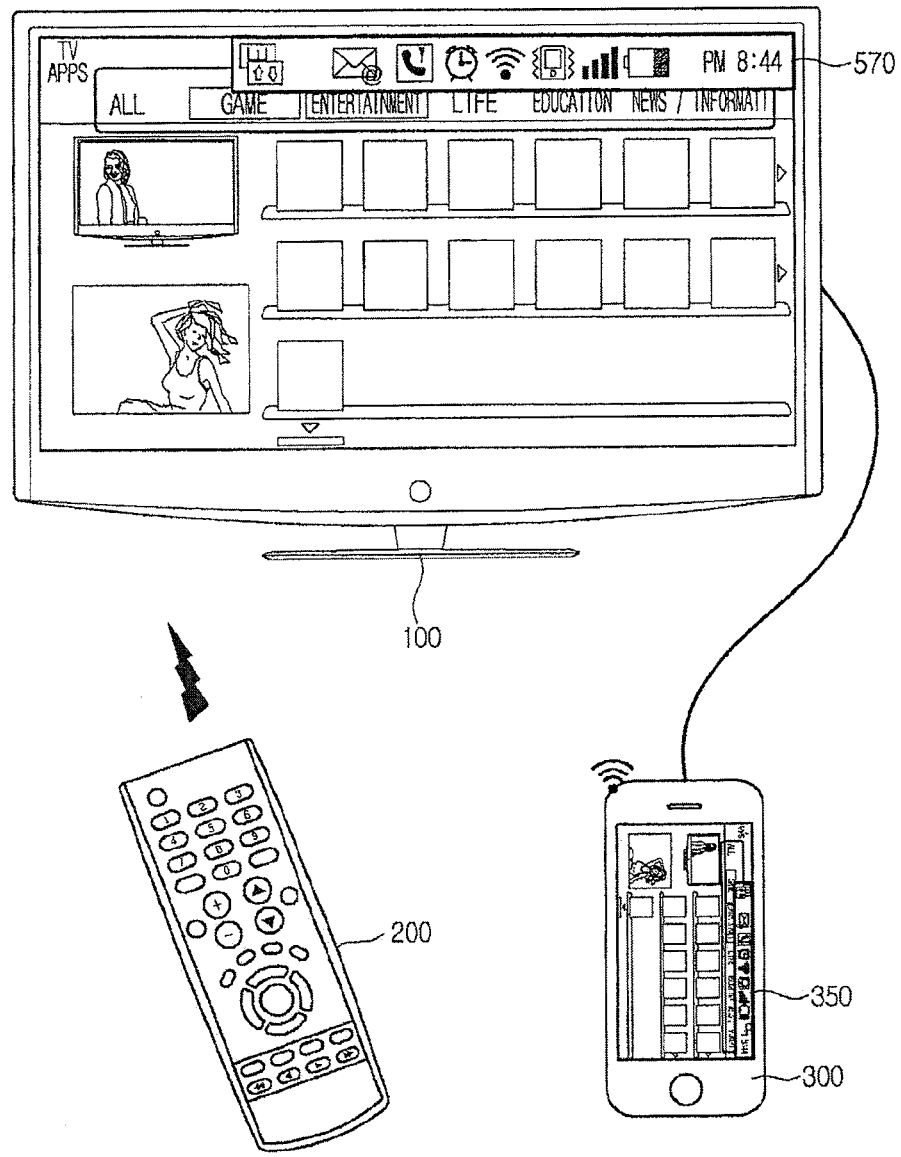
FIG. 20 is diagram illustrating that information of the portable terminal 300 is displayed on the image display apparatus 100 according to an embodiment of the present invention.

FIG. 20 is showing an example of where information of the portable terminal 300 is displayed on the image display apparatus 100 according to an embodiment of the present invention. Herein, the portable terminal 300 may be a terminal which can be connected to the Internet or other network and which can be called as a smart phone.

According to an embodiment of the present invention, an indicator, which includes at least one of network information, battery information, bell sound state information, alarm information, missed call information, and message reception information, is displayed on the video of the portable terminal 300 displayed on the image display apparatus 100.

Referring to the top of FIG. 20, an information screen 570, which indicates each of state information transmitted from a screen 350 of the portable terminal 300, is displayed on the screen of the apparatus 100.

The information screen 570 of the portable terminal 300 including icons as shown on the top of FIG. 20 will be described, respectively. The information screen 570 represents, from the left to the right, data communication state information, letter or e-mail massage reception information, missed call information, alarm setting information, network state (reception sensitivity) information, bell sound (silence, vibration, sound, etc.) state information, call reception information, battery information, and time information.

The user can view and confirm the state of the terminal 300 through the image display apparatus 100 without directly confirming the state of the terminal 300, by using at least one of the state information as described above after connecting the terminal 300 to the image display apparatus 100. The same state information is continuously updated and displayed on both screens of the apparatus 100 and terminal 300.

In addition, according to one embodiment, the bell sound states, the network connection states and the like of the portable terminal 300 may be set. A command on the menu setting screen of the portable terminal 300 may be input through the remote control device 200. The bell sound, which is a function provided with the portable terminal 300, may be set as silence, vibration, or sounds, and the wireless connection setting of AP connection information is also possible.

Figure 21:
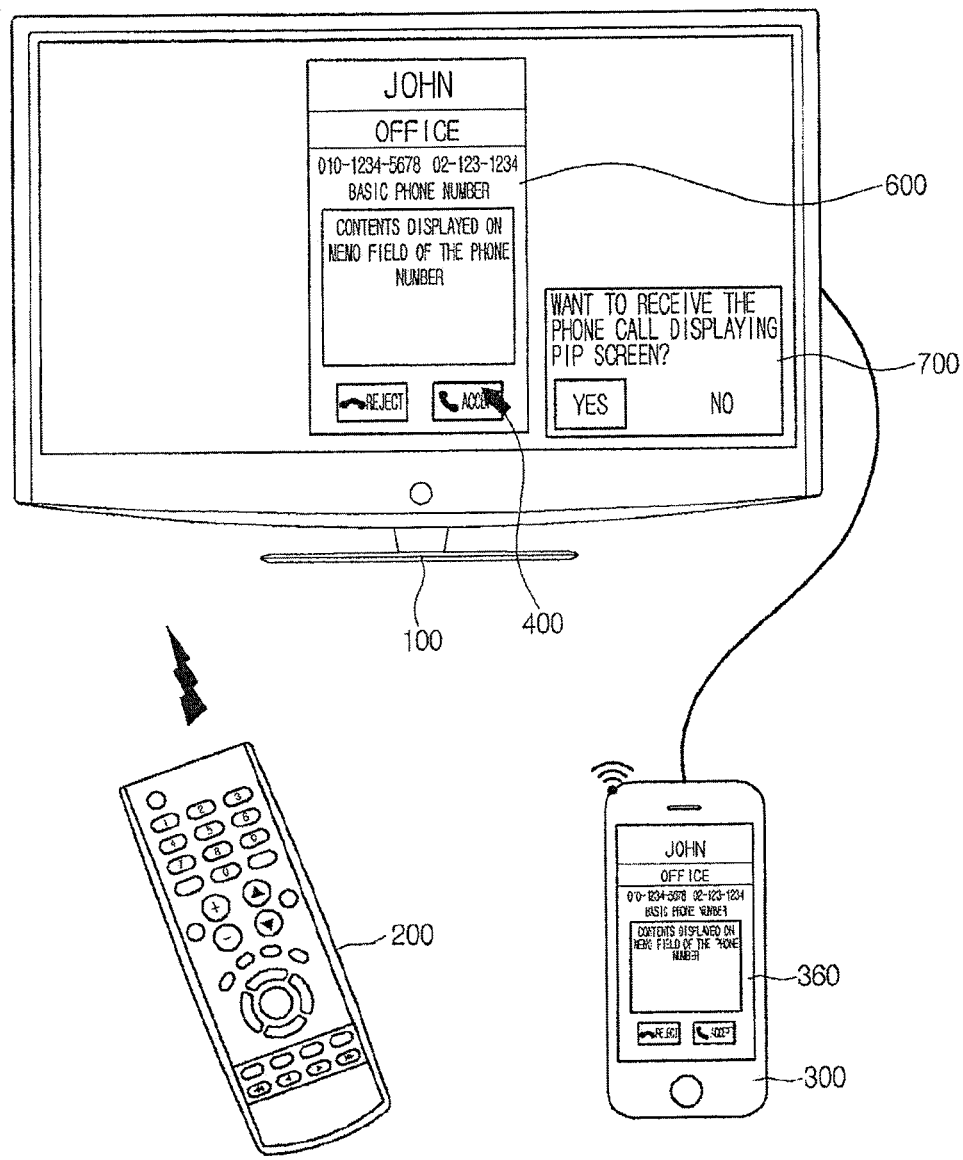
FIGS. 21 to 23 are diagrams illustrating that a telephone function of the portable terminal 300 is performed in the image display method according to an embodiment of the present invention.
Figure 22:
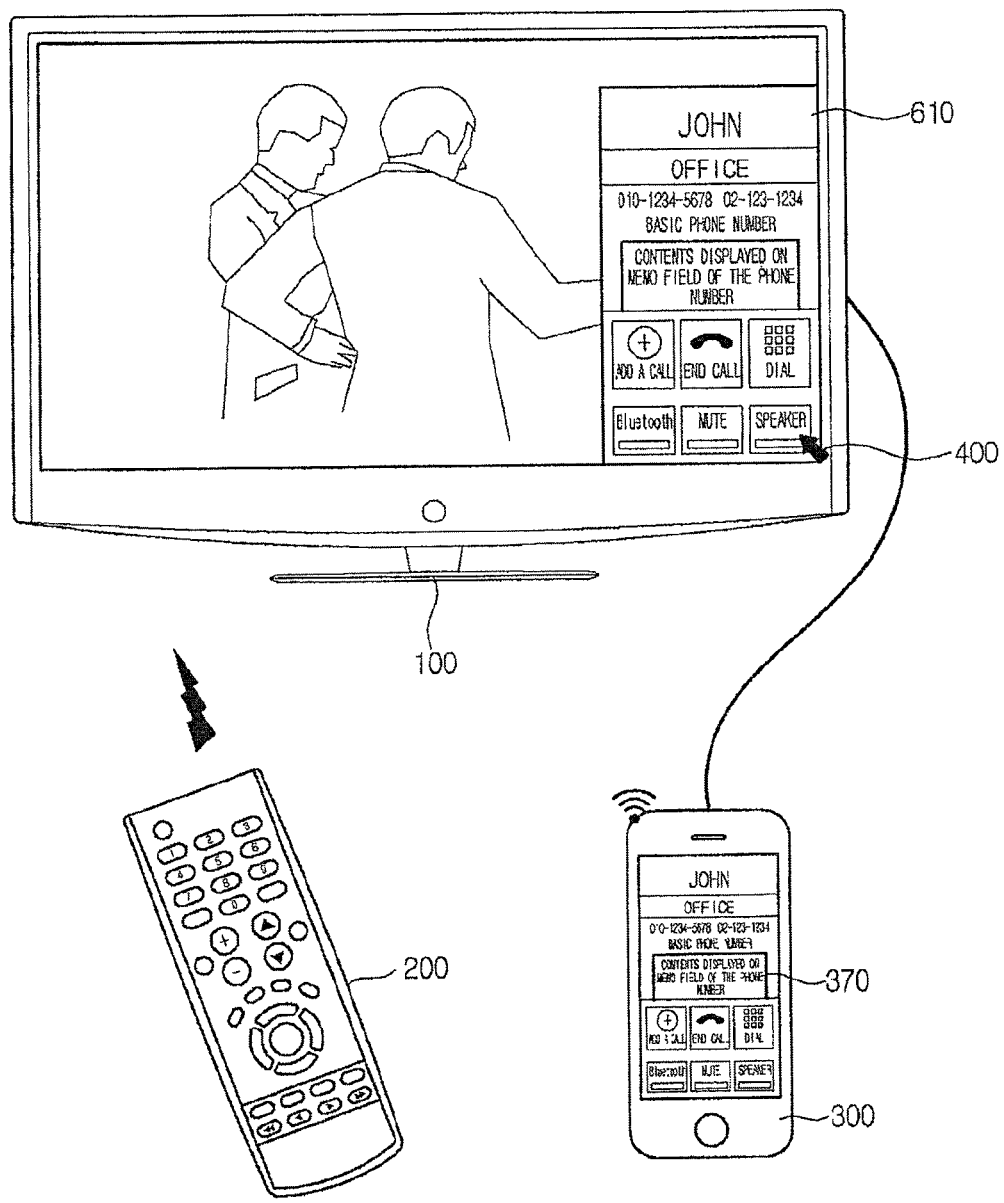
Figure 23:
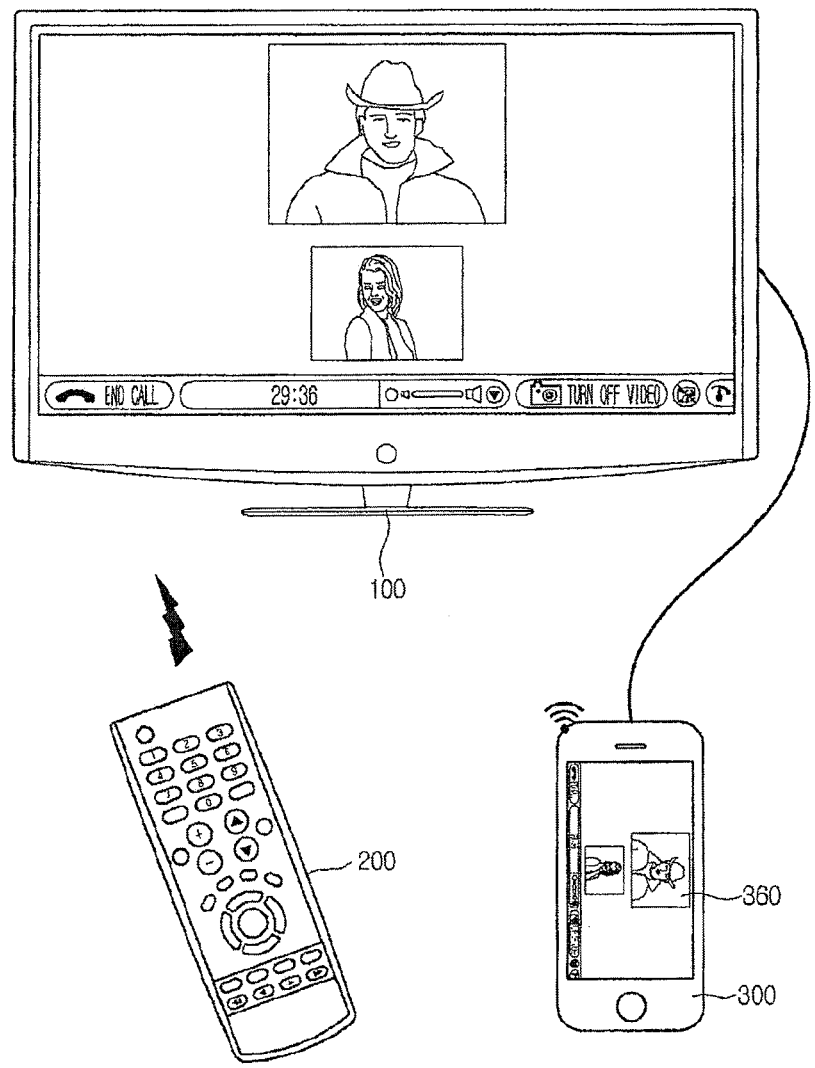

FIGS. 21 to 23 are diagrams illustrating an example of where a telephone function of the portable terminal 300 is performed in the image display method according to an embodiment of the present invention.

FIGS. 21 and 22 are showing that a phone call is received by the portable terminal 300 while reproducing the video of the portable terminal 300 on the screens of the apparatus 100 and terminal 300 according to the image display method of the present invention.

A screen image including a phone call received notification may be identically displayed on the image display apparatus 100 as a screen image 600 and on the portable terminal 300 as a screen image 360. In addition, when reproducing the screen image as a PIP screen, a phone call screen image 370 displayed on the portable terminal 300 may be displayed at the same time as a sub-screen 610 on the display unit 140 as shown in FIG. 22.

Further, when the phone call is received, an OSD screen image 700 for selecting whether the user wants to change as the PIP screen or wants to watch the phone call screen image as a full screen of the display unit 140, may be additionally displayed as shown in FIG. 21.

Herein, the user moves the pointer 400 through the remote control device 200 and transmits a control signal for clicking or touching phone call or refusal buttons to the image display apparatus 100, and the image display apparatus 100 transmits the control signal including pointer coordinate information to the portable terminal 300 such that the phone call function may be performed on the terminal 300. The operation performed on the terminal 300 may be displayed on the terminal 300 and the apparatus 100.

In addition, as above-mentioned method, even during a phone call, the functions of a speaker phone mode, a mute mode and the like provided on the portable terminal 300 may be performed.

More specifically, the functions corresponding to the pointer coordinate information transmitted from the apparatus 100 to the portable terminal 300 may be performed in the terminal 300 and/or apparatus 100. Further, there may be a method in which the control unit 170 receives the control signal of the remote control device 200 and converts the received signal into a touch command corresponding to the locations of the phone call, the phone call refusal, the speaker phone or the mute buttons, and then transmit the converted command to the portable terminal 300 for executed by the terminal 300.

Herein, the portable terminal 300 performs the phone call acceptance or refusal functions according to the touch commands and displays a screen image changed according to the phone call video based on the performed result. The control unit 170 may receive the changed video of the portable terminal 300 through the interface unit 110 and display the received changed video on the display unit 140.

FIG. 23 is showing an example of performing a video call according to an embodiment of the present invention. Referring to FIG. 23, the image display apparatus 100 may display the video call screen displayed on the portable terminal 300 connected to the apparatus 100.

Herein, the user may confirm the other party's video as the larger screen even without accessing the portable terminal 300 through the operation of the remote control device 200 or directly the operating the portable terminal 300.

When using the speaker phone mode and the like of the portable terminal 300, the video call is possible through the image display apparatus 100. For instance, the user may carry out the phone operations of the terminal 300 on the apparatus 100 using the apparatus 100.

Meanwhile, the image display apparatus 100 according to an embodiment of the present invention may transmit and receive data through the portable terminal 300 and the MHL and accordingly, various videos may be displayed according to the data received from the portable terminal 300 as well as the video reproduced on the portable terminal 300.

Figure 24:
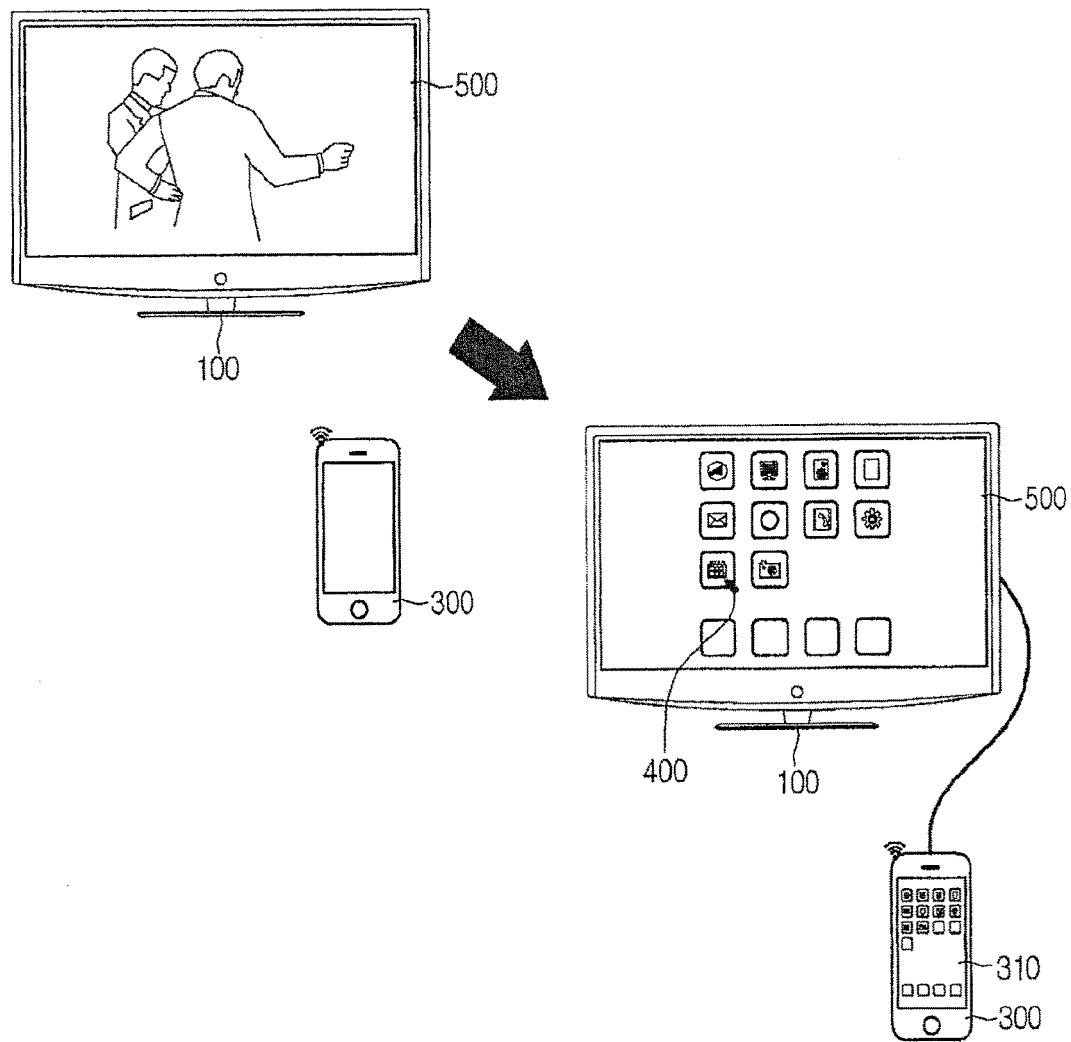
FIGS. 24 to 29 are diagrams illustrating various examples of an image display method using the image display apparatus 100 connected to the portable terminal 300 according to an embodiment of the present invention.

More specifically, the operation of the image display apparatus 100 according to an embodiment of the present invention will be described with reference to FIG. 24.

The image display apparatus 100 may display a standard TV screen image 500 received by the apparatus 100, e.g., via a broadcast station. Herein, once the connection of the portable terminal 300 to the apparatus 100 is detected through the MHL, the image display apparatus 100 may automatically display the screen identical to the screen 310 of the portable terminal 300, or a screen (not shown) for the image display apparatus 100 based on data transmitted from the portable terminal 300. Accordingly, there is a more convenient effect since the screen can be automatically switched without directly selecting the screen by the user.

Therefore, the image display apparatus 100 may receive and display a high-definition screen of HD (high definition) class from the portable terminal 300, and the portable terminal 300 may simultaneously display a low-definition screen for the portable terminal, unlike the high-definition screen displayed on the image display apparatus 100. As such, automatically the image displayed on the terminal 300 is displayed in a format suitable for the terminal 300 while the same image is displayed on the apparatus 100 in a format (which may be different from the format of the terminal 300) suitable for the apparatus 100.

Figure 25:
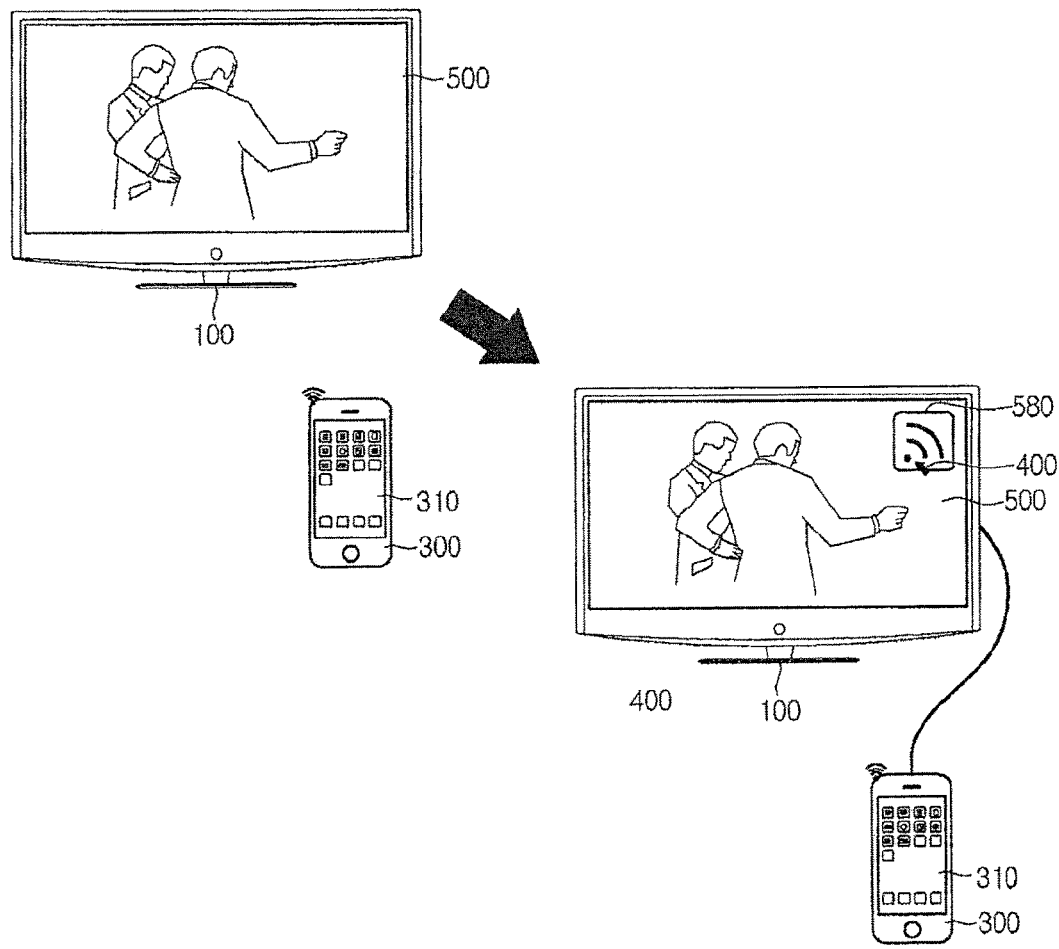

FIG. 25 is diagram representing an example of an indicator when sensing that the portable terminal 300 is connected to the apparatus 100 by the image display apparatus 100 according to an embodiment of the present invention.

Referring to FIG. 25, the image display apparatus 100 may display various screens based on data received from the portable terminal 300. As an embodiment, when the MHL cable connection is sensed between the apparatus 100 and terminal 300, an indicator 580 indicating that the connection is established may be displayed over the existing TV video 500 using the OSD. The user then can easily recognize that the portable terminal 300 is now connected to the apparatus 100 by viewing the indicator 580.

In addition, the indicator 580 may indicate that the portable terminal 300 is connected to the apparatus 100 by the change of colors and/or shapes or other configurations. For example; the indicator 580 is displayed as black before the portable terminal 300 is connected to the apparatus 100, and then the indicator 580 may be changed as red after the portable terminal 300 is connected to the apparatus 100. In addition, indicator 580 may be changed according to the states of the network connection of the portable terminal 300. In this case, there are advantages since the states of the portable terminal 300 may be recognized through the image display apparatus 100. For example, when the reception sensitivity of the network of the portable terminal 300 is good, the indicator 580 displayed on the display unit 140 is displayed as green and then the color of the indicator 580 may be changed as red in a case of the reception sensitivity becomes lower. Further, the size of the indicator 580 may be changed according to the reception sensitivity.

In addition, the image display apparatus 100 may display the image received from the portable terminal 300 when the user locates the pointer 400 on the indicator 580 and enters a click command by using the remote control device 200. Then an image received from the terminal 300 may be a main screen menu of the contents provided from the portable terminal 300 and may be a video of the portable terminal 300. And such image is displayed on the screen of the apparatus 100.

Figure 26:
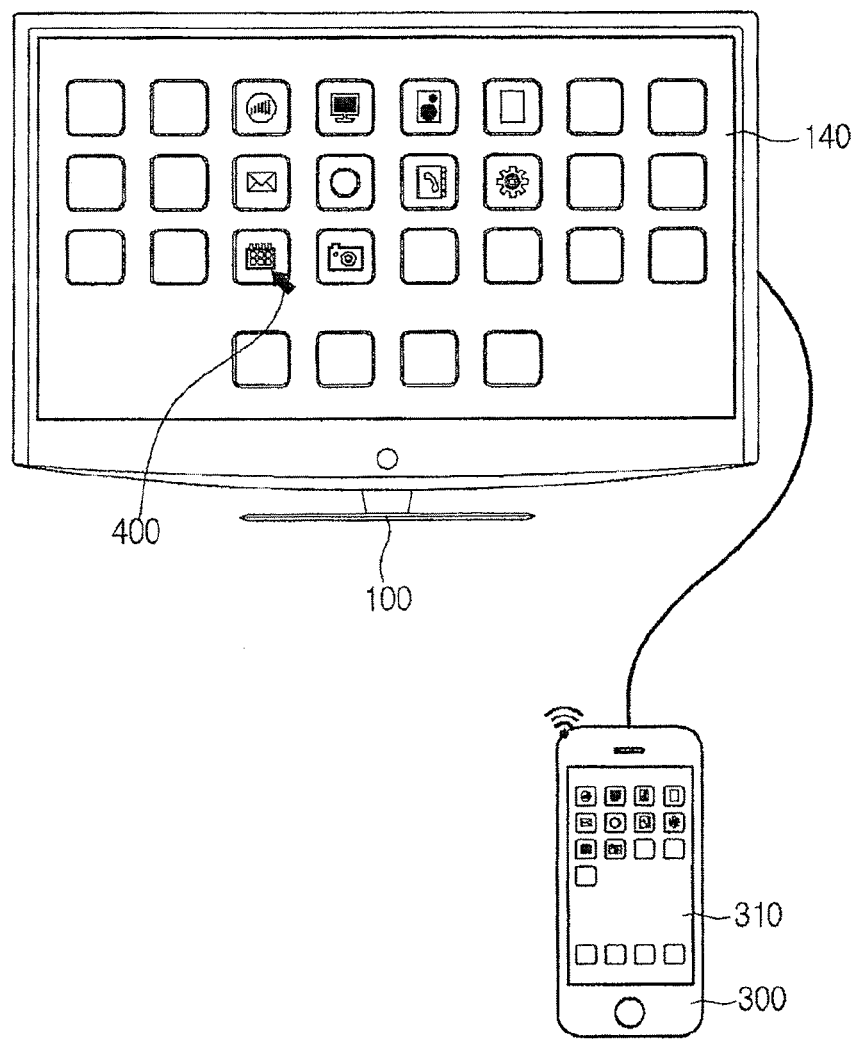

In addition, the data of the portable terminal 300 may be transmitted from the terminal 300 to the apparatus by converting menu icons of the portable terminal 300 into menu icons more suitable for the screen of the image display apparatus 100, as shown in FIG. 26.

FIG. 26 is a diagram showing a method where a menu icon screen of the portable terminal 300 is converted into a screen more suitable for the image display apparatus 100 and then displayed on the image display apparatus 100. The method of displaying the screen image of the portable terminal 300 on the image display apparatus 100 may be varied depending on the user's selection. Accordingly, all icons displayed on the portable terminal 300 as shown in FIG. 26 may be displayed on the image display apparatus 100 in a different format and/or configuration suitable for the apparatus 100. For example, a screen image of the portable terminal 300 which is divided into each column and moved one by one may be displayed such that a screen image of the image display apparatus 100 is divided into each column and re-arranged.

Meanwhile, the image display apparatus 100 may transmit TV channel and broadcast list information reproduced on the image display apparatus 100 to the portable terminal 300 when the MHL connection to the portable terminal 300 is sensed. The portable terminal 300 may transmit Internet/network captions searched based on the received TV channel and broadcast list information to the image display apparatus 100 for displaying.

Figure 27:
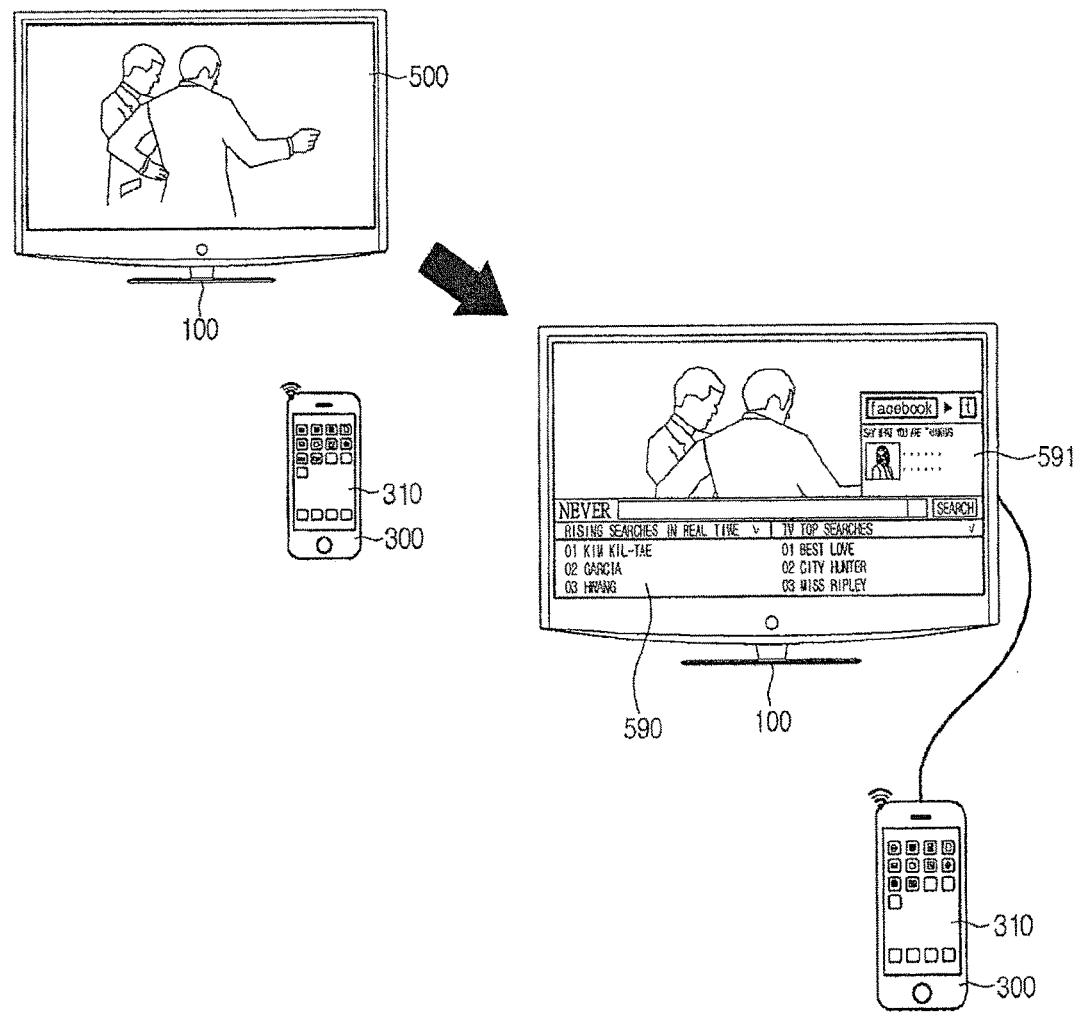

FIG. 27 is a diagram showing that Internet caption information for TV screens is displayed on the image display apparatus 100 when the apparatus 100 is connected to the portable terminal 300 according to an embodiment of the present invention. Herein, the image display apparatus 100 may display related caption information, guide information or the like 590 and related social network service (SNS) information 591, or the like received from the portable terminal 300 on one side of the screen of the apparatus 100 while the related TV program is being played on the screen of the apparatus 100. Therefore, the user may obtain information related to the video reproduced on the image display apparatus 100 over the Internet in real-time when the portable terminal 300 is only connected to the image display apparatus 100 without separately being connected to the Internet In addition, the image display apparatus 100 may transmit signals to the portable terminal 300 such that each of the functions of the portable terminal 300 may be controlled by such signals. The signal transmission may be performed through the MHL connection or other known connections, and for example, when the image display apparatus 100 senses the MHL connection with the terminal 300, a control signal is generated and transmitted from the terminal 300 to the portable terminal 300 such that the portable terminal 300 may be switched to a silence mode or a vibration mode. In addition, the function control of the connection sensing operation as described above may be set by the user.

In addition, the image display apparatus 100 may sense and operate when a phone call is received at the portable terminal 300 in the state where the portable terminal 300 is connected to the apparatus 100.

Figure 28:
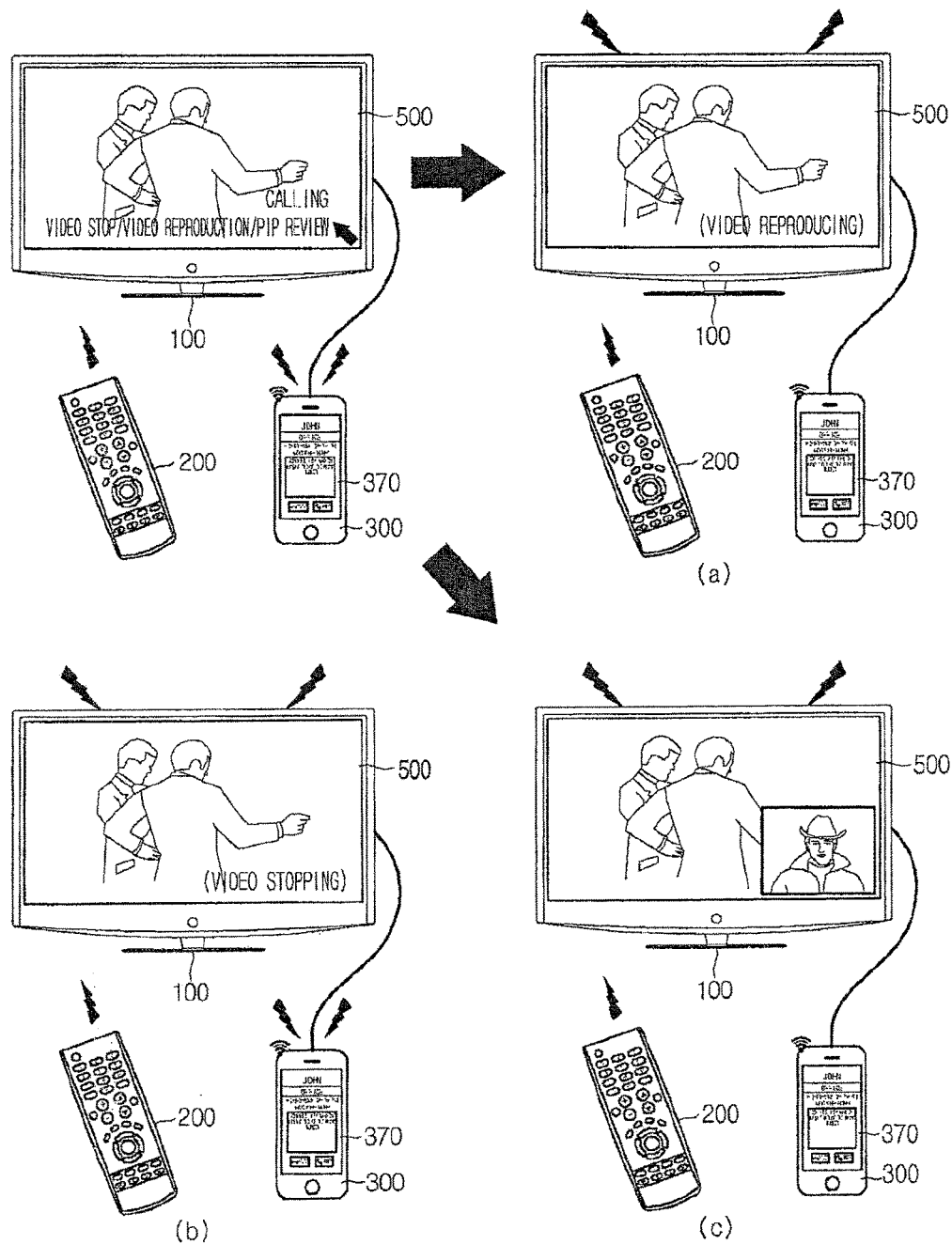

FIG. 28 is a diagram showing examples of possible operations when the portable terminal 300 connected to the apparatus 100 receives a phone call as described above according to an embodiment of the present invention.

The portable terminal 300 transmits a phone call reception notification signal to the image display apparatus 100 through the MHL connection when the phone call is received at the terminal 300. The image display apparatus 100 may display, on its screen, an OSD screen indicating that the phone call is received, and adjusts screen and voice outputs to be displayed according to the user's selection. Herein, the output of the received phone call may be set to be a voice output of the image display apparatus 100, and accordingly, the user may carry out the phone call by using the image display apparatus 100 without directly using the portable terminal 300.

Referring to FIG. 28(a), for example, when several people watch the video on the screen of the image display apparatus 100 while a phone call is received at the terminal 300 connected to the apparatus 100, a user may select to receive the phone call using the voice output of the image display apparatus 100 or the terminal 300 while continuously reproducing the video on the screen of the apparatus 100. Thus a conversation for the incoming call can be carried out using the audio output of the apparatus 100 or terminal 300 while the video is continuously played on the screen of the apparatus 100. In another example, when one person watches the video on the screen of the image display apparatus 100 and the user wants to stop playing of the video during the phone call is going on as shown in FIG. 28(b), the user may also select a method where the phone call conversations can be carried out by using the voice output of the image display apparatus 100 or terminal 300 while displaying of the video on the screen of the apparatus 100 is temporarily stopped.

In another example, as shown in FIG. 28(c), when the received phone call is a video phone call, the user can select to display the video separately on the PIP screen of the screen of the display unit 140, whereby the video of the apparatus 100 or terminal 300 and the video phone call of the terminal 300 may be watched at the same time on the same screen of the apparatus 100.

Figure 29:
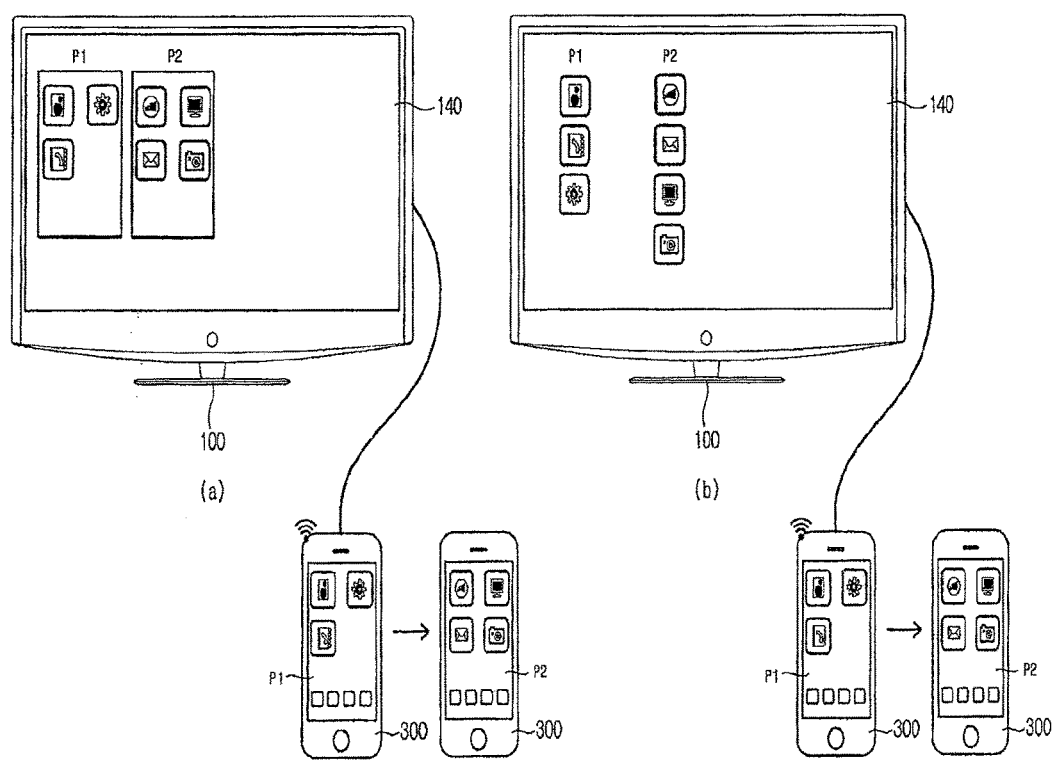

FIG. 29 is an diagram showing examples of displaying multiple pages and their associated icons of the terminal 300 on the single screen of the apparatus 100 according to an embodiment of the present invention.

As shown in FIG. 29(a), the terminal 300 can have a plurality of different pages (P1 and P2) each having associated icon(s). Due to the size limit on the screen of the terminal 300, these pages are generally displayed on at a time on the entire screen of the terminal 300. According to the present invention, all the pages P1 and P2 having associated icons of the terminal 300 can be simultaneously displayed on the screen of the apparatus 100 connected to the terminal 300. This feature takes an advantage of the large screen size of the apparatus 100 and enhances the user's viewing experience.

In the example of FIG. 29(a), the pages P1 and P2 of the terminal 300 are merely duplicated on the screen of the apparatus 100. In a different example of FIG. 29(b), the icons of the pages P1 and P2 of the terminal 300 are rearranged vertically on the screen of the apparatus 100. These are mere examples and other variations are possible.

According to the embodiments of the present invention, as discussed above, when the portable terminal 300 is connected to the image display apparatus 100, an image from the terminal 300 is automatically converted into a format suitable for displaying on the apparatus 100, which is then displayed on the apparatus 100 in that format. This enhances the user's viewing experience.

Further the apparatus 100 can detect and indicate that the terminal 300 is nearby the apparatus 100 to the user. For instance, without being wirelessly connected, the apparatus 100 can first detect that the terminal 300 is a nearby device to which the apparatus 100 can connect wirelessly. Then the user can decide to connect the apparatus 100 to the terminal 300 and can select to display an image from the terminal 300 on the screen of the apparatus 100.

Furthermore, while viewing a program on the apparatus 100, if the terminal 300 is connected to the apparatus 100, the terminal 300 can download information related to the program being displayed on the apparatus 100 and then display it on a side of the program being displayed on the apparatus 100 at the same time.

Moreover, while viewing a program on the apparatus 100, if the terminal 300 is connected to the apparatus 100 and an incoming call is received at the terminal 300, the user can continue to view the program on the apparatus 100 while receiving the call using dual processors.

In addition, while viewing a program on the apparatus 100, if the terminal 300 is connected to the apparatus 100 and an incoming call is received at the terminal 300, the terminal 300 can automatically switch to a vibration mode so that its sound does not conflict with the sound of the program being played on the apparatus 100. Here the apparatus 100 can generate and send a control signal for initiating a vibration mode to the terminal 300 so that the terminal 300 can be switched to the vibration mode according to this control signal. At the same time, an ODS indication can be displayed on the screen of the apparatus 100 to indicate the incoming call to the user.

The image display apparatus 100 can be preferably a TV such as a smart TV, a 3D TV, etc. or can be any device capable of displaying images such as computer laptop, tablets, multimedia playing device, or another portable terminal such as a smart phone. Further, as mentioned above, the portable terminal 300 can be a smart phone or other mobile terminal such as a navigation device, a personal digital assistant (PDA), etc.

The image display methods and the image display apparatuses according to the embodiments of the present invention as described above can also be embodied as programs to be executable in one or more computers and be stored in at least one computer readable recording medium. Examples of the computer readable recording media include read-only memory (ROM), random-access memory (RAM), CD-ROMs, magnetic tapes, floppy disks, optical data storage devices, and so on. Furthermore, it can be implemented as carrier waves (such as data transmission through the Internet).

The computer-readable recording media can be distributed on computer systems connected through the network, and thus the computer-readable recording media may be stored and executed as the computer-readable code by a distribution scheme. In addition, function programs, codes and code segments for implementing the method may be easily deduced by programmers in the field of technology belong to the present invention.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. A display apparatus, the apparatus comprising:
   a display unit;
   an interface unit configured to receive video data from an external device; and
   a control unit configured to:
   display a first screen on the display unit;
   display, on the display unit, a second screen based on the received video data according to connecting to the external device, wherein the second screen is a screen being displayed on the external device;
   receive a request for controlling the external device; and
   in response to the request, transmit, to the external device, a control signal to perform a function of the external device corresponding to a specific location on the second screen displayed on the display unit,
   wherein the control unit is further configured to display, on the display unit, an indicator indicating that a connection between the display apparatus and the external device is established.

2. The apparatus according to claim 1, further comprising:
   a tuner configured to receive a broadcast video, wherein the first screen includes the broadcast video.

3. The apparatus according to claim 1, wherein the control unit displays an indicator including network connection state information, battery information or message reception information of the external device.

4. The apparatus according to claim 1, wherein the first screen is displayed as a full screen and the second screen is displayed as a Picture In Picture (PIP) on the display unit.

5. The apparatus according to claim 1, wherein the control unit displays the second screen adjusted based on an aspect ratio of the display unit.

6. The apparatus according to claim 1, further comprising:
   a communication unit configured to receive the request from a remote controller.

7. The apparatus according to claim 6, wherein the control unit displays a pointer, on the second screen, which is moved according to a movement of the remote controller, and
   wherein the control signal includes a coordinate value corresponding to a location of the pointer.

8. The apparatus according to claim 6, wherein the request includes a RF signal and an infrared signal.

9. The apparatus according to claim 1, wherein the second screen is an incoming call screen, and
   wherein the incoming call screen is a screen being displayed on the external device when the external device receives an incoming call.

10. The apparatus according to claim 9, wherein the first screen is displayed as a full screen and the incoming call screen is displayed as a Picture In Picture (PIP) on the display unit.

11. The apparatus according to claim 1, wherein the control unit further displays a menu for selecting whether or not to display the second screen on the display unit.

12. The apparatus according to claim 9, wherein the incoming call screen includes a button related to a phone call, and
    wherein the control unit transmits, to the external device, the control signal to perform the function related to the phone call if the button is selected.

13. The apparatus according to claim 1, wherein the display apparatus is connected to the external device by a MHL (Mobile High definition Link (MHL) cable.

14. The apparatus according to claim 1, wherein the control signal includes coordinate value information related to the specific location on the second screen displayed on the display unit.

15. The apparatus according to claim 1, wherein the control unit displays a menu for selecting whether the second screen is displayed as a PIP (Picture In Picture) screen.

16. The apparatus according to claim 1, wherein the first screen is changed to the second screen according to connecting to the external device.

17. The apparatus according to claim 16, wherein a display mode of the external device includes a landscape mode and a portrait mode, and
    wherein the second screen displayed on the display unit in the landscape mode of the external device and the second screen displayed on the display unit in the portrait mode of the external device are different from each other.

18. The apparatus according to claim 16, wherein if the display mode of the external device is the portrait mode, a screen of the display unit includes the second screen and a black screen on a right side and a left side, and
    wherein, if the display mode of the external device is the landscape mode, the second screen is displayed as a full screen on the display unit.

* * * * *